3,766,237
HYDROCYANATION OF OLEFINS
Yuan-tsan Chia and William Charles Drinkard, Jr., Wilmington, Del., and Edward Noonan Squire, Glen Mills, Pa., assignors to E. I. du Pont de Nemours and Company, Wilmington, Del.
No Drawing. Continuation of abandoned application Ser. No. 832,435, June 11, 1969, which is a continuation-in-part of abandoned application Ser. No. 667,087, Sept. 12, 1967. This application Jan. 25, 1972, Ser. No. 220,707
Int. Cl. C07c 121/04
U.S. Cl. 260—465.3        18 Claims

ABSTRACT OF THE DISCLOSURE

A process for the hydrocyanation of selected unsaturated compounds utilizing a nickel complex catalyst in the presence of an excess of a triaryl phosphite.

CROSS-REFERENCES TO RELATED APPLICATION

This is a continuation of copending application Ser. No. 832,435, filed June 11, 1969 by Yuan-tsan Chia, William Charles Drinkard, Jr. and Edward Noonan Squire, now abandoned, which in turn is a continuation-in-part of application Ser. No. 667,087, filed Sept. 12, 1967 by the same inventors and now abandoned.

BACKGROUND OF THE INVENTION

It is known that the addition of hydrogen cyanide to double bonds adjacent to an activating group, such as a nitrile or a carboxy group, proceeds with relative ease. However, the addition of hydrogen cyanide to non-activated double bonds proceeds only with difficulty, if at all, and normally requires the use of high pressure of about 1,000 p.s.i. or more and high temperatures in the range of 200 to 400° C. U.S. Pat. No. 2,571,099, issued on Oct. 16, 1951, to Paul Arthur, Jr., and Burt Carlton Pratt, discloses an improvement over this technique, which improvement involves the use of nickel carbonyl with or without the addition of a tertiary aryl phosphine or arsine. This process suffers from producing a relatively high percentage of undesirable polymeric products when applied to mono-olefinic starting materials and a relatively poor yield in all cases. Furthermore, this process is not satisfactory for the production of adiponitrile from pentenenitriles.

Copending application Ser. No. 509,432, filed Nov. 23, 1965, by William C. Drinkard, Jr., and Richard V. Lindsey, Jr., relates to an improvement over this process which involves the use of catalyst of selected nickel compounds.

SUMMARY OF THE INVENTION

The present invention is an improvement over this process, which improvement is obtained by incorporating an excess of a triaryl phosphite in the reaction mixture in conjunction with a nickel compound catalyst and, if desired, a promoter, such as described below.

The present invention provides a process which produces nitriles by addition of hydrogen cyanide to unsaturated compounds in high yields, under mild conditions, with minimal formation of polymer with improved catalyst performance.

The process of the present invention is generally applicable to ethylenically unsaturated organic compounds of from 2 to 20 carbon atoms having at least one aliphatic carbon-carbon double bond which organic compounds are selected from the class consisting of aliphatic and aromatic hydrocarbons and aliphatic and aromatic hydrocarbons containing groups selected from the class consisting of

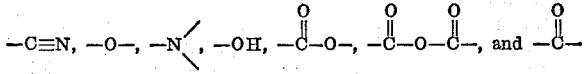

wherein each open bond is connected to hydrogen or an aliphatic or aromatic hydrocarbon group wherein the carbon-carbon double bond is insulated from the aforesaid groups by at least one carbon atom, which organic compounds contain from 2 to 20 carbon atoms. The open chain conjugated olefins such as butadiene and the pentenenitriles, such as 3-pentenenitriles and 4-pentenenitrile, are especially preferred. Suitable unsaturated compounds include olefins and olefins substituted with groups which do not attack the catalyst such as non-conjugated cyano. Preferred unsaturated compounds include monoolefins containing from 2 to 20 carbon atoms, such as ethylene, propylene, butene-1, pentene-2, hexene-2, etc., diolefins such as butadiene-1,3, isoprene, allene, substituted compounds such as styrene, α-methyl-styrene, and cyano substituted olefins such as 2-methyl-3-butenenitrile, 3-pentenenitrile, and 4-pentenenitrile. However, the present process offers its greatest advantage over previous processes in the production of dinitriles such as adiponitrile from unsaturated nitriles such as 3-pentenenitriles or 4-pentenenitrile and the production of cyanobutenes such as 3-pentenenitriles and 4-pentenenitrile from butadiene-1,3. In this process, yields of adiponitrile in excess of 65 percent as based on the starting material converted, are generally obtained and under optimum conditions, yields in excess of 80 percent can consistently be obtained. Furthermore, a high number of cycles (mole ratio of product to catalyst) can be obtained. The number of cycles obtained generally is over 40, often over 100 and under optimum conditions, can run well over 200.

Nickel compounds useful in this invention may be preformed or prepared in situ and include nickel compounds containing ligands such as phosphines, arsines, stibines, phosphites, arsenites, antimonites, and mixtures thereof.

A preferred class of compounds are nickel complexes of phosphites, arsenites, antimonites, phosphines, arsines or stibines which cause the isomerism of 3-pentenenitriles to 4-pentenenitrile. These catalysts are particularly useful for the synthesis of adiponitrile and substituted adiponitriles. This property of isomerization may readily be ascertained by contacting pure 3-pentenenitrile with the catalyst in the presence of 1 mole of H$_2$SO$_4$ per mole of nickel followed by heating to 120° C. during 1 hour, and then analyzing for 4-pentenenitrile such as by gas chromatography using a 2-meter, ¼ inch outside diameter copper tube packed with 20 percent (by weight) tris(2-cyanoethoxypropane) on 60–80 mesh (U.S. standard sieve size) firebrick. The adsorbant is maintained at 100° C. and the vaporizer at 150° C., and a helium flow of 75 ml./min. is used. A thermal conductivity detector may be employed. The relative elution time of 4-pentenenitrile is about 30 minutes. The formation of 4-pentenenitrile may be taken as indicating that the catalyst catalyzes the isomerization of 3-pentenenitriles to 4-pentenenitrile. Preferably, at least 0.5 percent of 4-pentenenitrile should be formed. The catalysts prepared in situ as hereinafter described may be considered as meeting this test if the nickel compound, and the ligand, when added together, perform as required for the preformed nickel complexes.

A preferred group of these nickel complexes have the general structure:

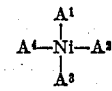

where $A^1$, $A^2$, $A^3$, and $A^4$ are neutral ligands which may be the same or different and are selected from the class consisting of M(XYZ) wherein M is selected from the class consisting of P, As, and Sb, and wherein X, Y, and Z may be the same or different and are selected from the class consisting of R, and OR, and wherein R is selected from the class consisting of alkyl and aryl groups having up to 18 carbon atoms. If desired, any of X, Y, and Z may be conjoined where possible. It is believed that in these nickel complexes at least some of the nickel is present in the zero valent state.

Many nickel compounds which are not themselves active as catalysts are converted by the ligands of this invention to nickel compounds which are active in the practice of this invention. The compounds active in the practice of this invention may actually be in equilibrium with the reactants, with any reaction modifiers and with any excess ligand present in the reaction mixture during the practice of this invention. It is believed that the metastable compounds existing in these equilibria are involved in the mechanism by which the above nickel compounds act in causing the addition of hydrogen cyanide to the unsaturated compounds of this invention.

These nickel catalyst compounds, i.e., $$Ni(A^1)(A^2)(A^3)(A^4)$$

can be isolated from the reaction mixture and are regarded as the catalyst herein. However, it should be recognized that the active catalyst species is probably some modification of these nickel compounds which exists under the reaction conditions.

In accordance with the present invention, an excess of a triaryl phosphite having the formula $P(OAr)_3$, wherein Ar is selected from the class of aryl groups of up to 18 carbon atoms, is incorporated in the reaction mixture. Triphenyl phosphite, tri(p-methoxyphenyl) phosphite, and trialkaryl phosphites, particularly tricresyl phosphites, are especially preferred triaryl phosphites. Generally, at least 6 moles of triaryl phosphite, per mole of nickel present in the reaction mixture, is present. This means that at least 6 moles must be present where the 6 moles include any phosphite otherwise fed to the reactor such as that in tetrakis [(triaryl) phosphite]nickel (O).

For purposes of this invention the presence of these 6 moles of triaryl phosphite is regarded as being a 2 mole excess of triaryl phosphite above the 4 moles of triaryl phosphite in tetrakis [(triaryl) phosphite]nickel (O). Even greater advantages are obtained when at least 12 moles of triaryl phosphite, which means an 8 mole excess as based on the nickel present in the reaction mixture, is used. The only limit of excess triaryl phosphite involves practical considerations for it may even be used as the solvent. However, generally, there is no advantage to be obtained in using over a 350 mole excess of triaryl phosphite as based on the nickel compound.

This excess triaryl phosphite may be used to improve catalyst performance particularly the isomer distribution of the products and, hence, reduce the amount of by-products formed as well as to extend catalyst life. For instance, in the hydrocyanation of 3- or 4-pentenenitrile, an increased yield of adiponitrile is obtained through use of excess triaryl phosphite.

Satisfactory techniques for preparing certain of these nickel compounds may be found in U.S. Pat. No. 3,328,443, issued June 27, 1967, to Messrs. Reginald Francis Clark and Charles Dean Storrs. Other techniques for preparing these catalysts are described in J. Chatt and F. A. Hart, Chem. Soc. Journal (London), pp. 1378–1389 (1960) and by Lewis S. Meriwether and Marilyn L. Fiene, J. Am. Chem. Soc., 81, 4200–4209 (1950).

There are several techniques for in situ preparation of the catalyst. For example, nickel carbonyl and a triaryl phosphite can be added to the reaction mixture. A second technique involves adding the triaryl phosphite, a nickel (II) compound such as a nickel halide, e.g., $NiCl_2$, $Ni(CN)_2$ or bis-(acetylacetonoto) nickel and a reducing agent such as an active metal such as zinc or a source of hydride ions, such as compounds of the structure $M'BH_4$, $M'AlH_4$, and $M'H_X$ where $M'$ is an alkali metal or an alkaline earth metal and X is a number corresponding to the valence of the metal. A third technique is to add an organonickel compound such as dicyclopentadienyl nickel to the triaryl phosphite. A fourth technique is to add a salt of $[Ni(CN)_4]^{-4}$ such as $K_4Ni(CN)_4$ to the reaction mixture. In each case, the catalyst usually can be formed under the hydrocyanation reaction conditions hereinafter described and no other special temperatures or pressures need be observed.

In general, an in situ preparation of the catalyst may be performed by mixing, under the moderate temperatures used for the hydrocyanation reaction, the triaryl phosphite with a nickel containing composition selected from the class consisting of organonickel compounds and nickel compounds of the structure

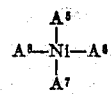

The ligands useful as any of $A^5$, $A^6$, $A^7$, and $A^8$ may be defined as atoms or molecules capable of functioning as a sigma pi/bonded partner in one or more coordinate bonds. A description of such ligands may be found in Advanced Inorganic Chemistry by F. Albert Cotton and G. Wilkinson, published by Interscience Publishers, a division of John Wiley & Sons, 1962, Library of Congress Catalog Card No. 62–14818; particularly on pp. 602–606.

More specifically, $A^5$, $A^6$, $A^7$, and $A^8$ are neutral ligands selected from the class consisting of CO and M(XYZ) wherein M is selected from the class consisting of P, As, and Sb, and wherein X, Y, and Z are selected from the class consisting of R, and OR, wherein R is selected from the class consisting of alkyl and aryl groups having up to 18 carbon atoms.

The term "organonickel compound" as used herein is used in the sense of a compound containing at least one nickel to organic carbon bond or a nickel atom bonded directly to a carbon atom including a $\pi$ bond wherein said carbons are further bonded to additional carbon atoms and/or hydrogens. Thus, according to this definition, carbon containing groups such as cyanide, carbonyl, thiocyanate, carbonate, etc., are not considered as containing an organic carbon atom and nickel bonded only to such groups would not be an organonickel compound.

In the organonickel compounds, nickel may exist in a variety of formal valence states. Suitable organonickel compounds for use in the present invention for in situ preparation of the catalyst are extremely numerous and varied in structure. Suitable organonickel compounds for use in the present invention include:

$[(CH_3)Ni(-CH_2P[C_6H_5]_2)_2]Br$,
$[o\text{-}BrC_6H_4Ni(P[C_2H_5]_2[C_6H_5])_2]Br$,
$(C_6H_5)_2Ni[P(C_2H_5)_3]_2$,
$(C_6H_5)_2Ni[P(C_3H_7)_3]_2$,
diethylnickel,
diphenylnickel,
dimesitylnickel,
$(C_5H_5)_2Ni$,
$[C_5H_5Ni(CO)]_2$,

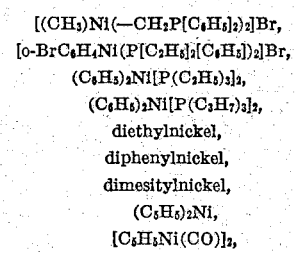

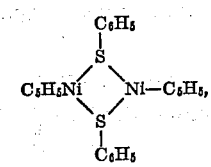

$C_5H_5Ni(CO)I$,
$C_5H_5Ni[P(C_6H_5)_3]CF=CFCF=CF_2$,
$C_5H_5Ni[P(C_2H_5)_3]I$,
$C_5H_5Ni[P(C_6H_5)_3]Cl$,
$C_5H_5Ni[P(C_6H_5)_3]I$,
$(CH_3C_5H_4)Ni[P(C_4H_9)_3]Br$,
$(CH_3C_5H_4)Ni[P(C_6H_4CH_3)_3]Cl$,
$(C_9H_7)Ni[P(C_4H_9)_3]I$,
$(C_9H_7)Ni[P(C_{10}H_{21})_3]Br$,
$K[C_5H_5Ni(CO)]$,
$C_5H_5Ni(CO)CF_3$,
$C_5H_5Ni(CO)C_2F_5$,
$C_5H_5Ni(CO)CH_2CF=CF_2$,
$C_5H_5Ni(CO)CF=CFCF_3$,
$C_5H_5Ni(CO)CF_2CF_2CF_3$,
$C_5H_5Ni[P(C_6H_5)_3]CH_3$,
$C_5H_5Ni[P(C_6H_5)_3]C_2F_5$,
$C_5H_5Ni[P(C_6H_5)_3]C\equiv CH$,
$C_5H_5Ni[P(C_2H_5)_3]C_2H_5$,
$C_5H_5Ni[P(C_6H_5)_3]CF=CFCF=CF_2$,
$C_5H_5Ni[P(C_6H_5)_3]C_6H_5$,
$C_5H_5Ni[P(C_6H_5)_3]C\equiv CC_6H_5$,
pi-allylcyclopentadienylnickel,
cyclopentadienyl(1-methyl-pi-allyl), nickel,
cyclopentadienyl(pi-2-hendecenyl) nickel,
cyclopentadienyl-pi-cyclopentenyl-nickel,
6-chloro-6,7,7-trifluorobicyclo[3.2.0] heptenyl cyclopentadienylnickel,
cyclopentadienyl(6,6,7,7-tetrafluoro-bicyclo[3.2.0]heptenyl)nickel,
cyclopentadienyl(8,9-dihydro-4,5,6,7-tetramethylindenyl)nickel,
cyclopentadienyl(4,5,6,7,8,-9-hexahydro-4,5,6,7-tetramethylindenyl)nickel,
(methylcyclopentadienyl)-pi-2-pentenylnickel,
(methylcyclopentadienyl)(phenyl-pi-2-propenyl)nickel,
(methylcyclopentadienyl)(methylcyclo-pentenyl)nickel,
pi-2-butenyl(octyl-pi-cyclopentadienyl)nickel,

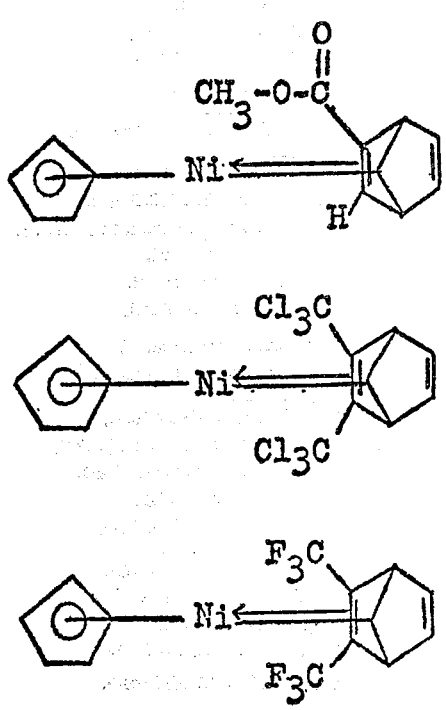

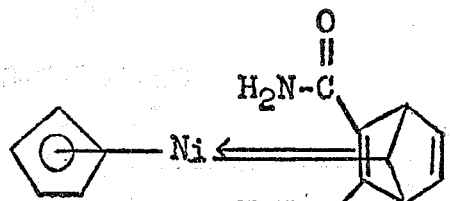

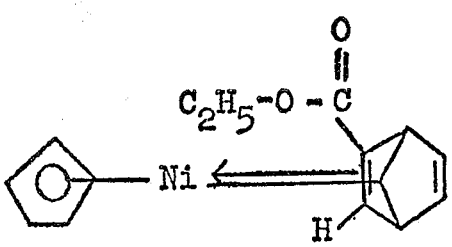

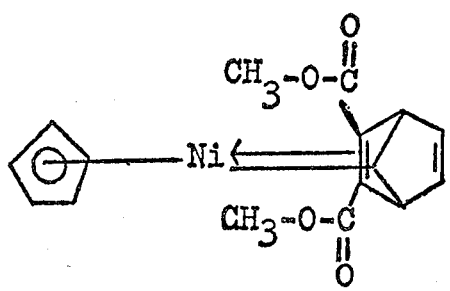

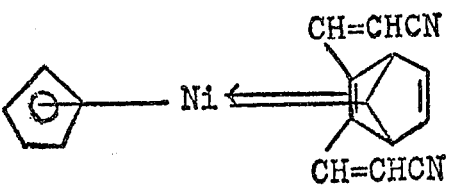

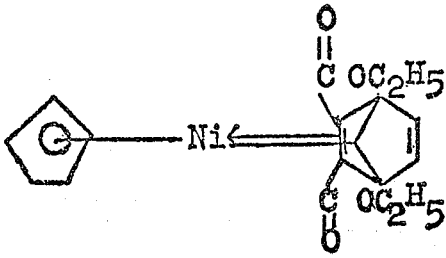

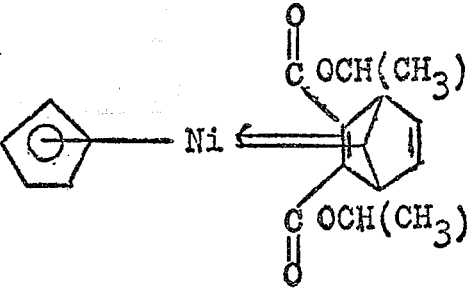

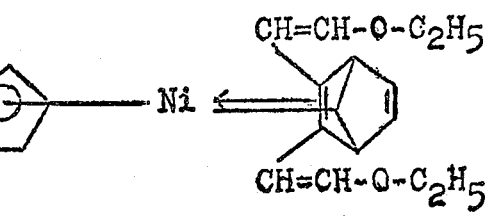

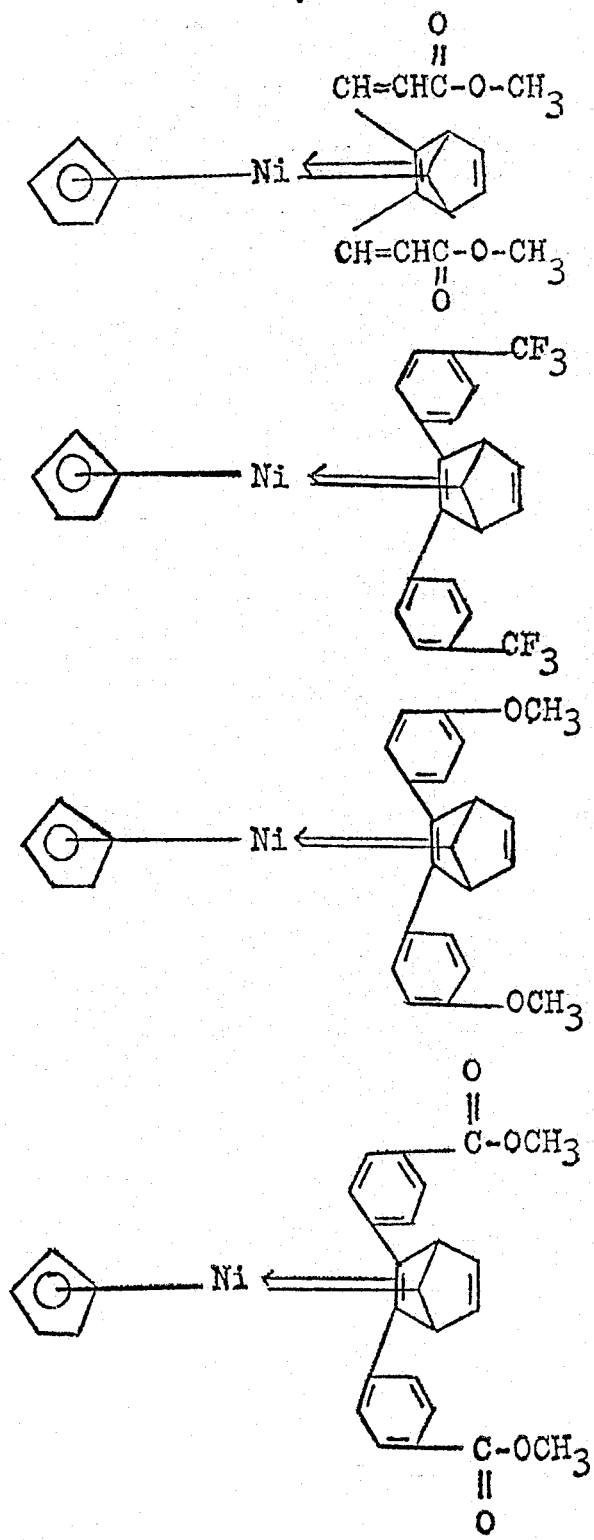

cyclopentadienylnitrosylnickel,
(methylcyclopentadienyl)nitrosylnickel,
(ethylcyclopentadienyl)nitrosylnickel,
(1-isopropyl-3-methylcyclopentadienyl)nitrosylnickel,
(propylcyclopentadienyl)nitrosylnickel,
(n-hexylcyclopentadienyl)nitrosylnickel,
(diethylcyclopentadienyl)nitrosylnickel,
(4-carboxybutyrylcyclopentadienyl)nitrosylnickel,
(hexylcyclopentadienyl)nitrosylnickel,
[α,α-dimethylbenzyl)cyclopentadienyl]nitrosylnickel
indenylnitrosylnickel,
dicarbonylbis(methylcyclopentadienyl)dinickel,
$(C_5H_5Ni)_2 \cdot HC \equiv CH$,
$(C_5H_5Ni)_2 \cdot HC \equiv CCH_3$,
$(C_5H_5Ni)_2 \cdot CF_3C \equiv CCF_3$,
$(C_5H_5Ni)_2 \cdot HC \equiv CCOCH_3$,
$(C_5H_5Ni)_2 \cdot CH_3C \equiv CCH_3$, $(C_5H_5Ni)_2 \cdot HC \equiv CCOC_2H_5$,
$(C_5H_5Ni)_2 \cdot HC \equiv CC_3H_7$,
$(C_5H_5Ni)_2 \cdot CH_3OCC \equiv CCOCH_3$,
$(C_5H_5Ni)_2 \cdot C_2H_5C \equiv CC_2H_5$,
$(C_5H_5Ni)_2 \cdot HC \equiv CC_4H_9$,
$(C_5H_5Ni)_2 \cdot HC \equiv CC_6H_5$,
$(C_5H_5Ni)_2 \cdot (CH_3)_2CHCC \equiv CCCH(CH_3)_2$, $(C_5H_5Ni)_2 \cdot C_6H_5C \equiv CC_6H_5$,
$(C_5H_5Ni)_2 \cdot C_6H_5C \equiv CC \equiv CC_6H_5$
$[(CH_3C_5H_4)Ni]_2 \cdot C_3H_7C \equiv CC_3H_7$,
$(C_9H_7Ni)_2 \cdot CF_3C \equiv CCF_3$,
$(C_9H_7Ni) \cdot C_2H_5C \equiv CC_2H_5$,
$[(C_5H_5Ni)_2 \cdot C_6H_5C \equiv C]_2$,
di-mu-(dimethylphosphino)bis(cyclo-pentadienylnickel),
di-mu-(diphenylphosphino)bis(cyclo-pentadienylnickel),
di-mu-(dimethylarsino)bis(cyclopentadienylnickel),
bis(methanethiolato)bis(cyclopentadienylnickel),
bis(ethylthiolato)bis(cyclopentadienylnickel),
dicarbonyltris(cyclopentadienylnickel),
cyclopentadienyl(dibromocyclopentenyl)nickel,
cyclopentadienyl(tetrachlorocyclopentyl)nickel,
cyclopentadienyl(tetraiodocyclopentyl)nickel,
cyclopentadienyl,o-(phenylazo)phenyl]nickel,
bis(cyclopentadienyl)bis(phenylisocyanide)dinickel,
[1,1,1,4,4,4-hexafluoro-2-butene-2,3-dithiolato(2-)]cyclopentadienylnickel
bis(methylcyclopentadienyl)nickel,
bis(isopropylcyclopentadienyl)nickel,
bis(tert-butylcyclopentadienyl)nickel,
bis,(α,α-dimethylbenzyl)cyclopentadienyl]nickel,
bis[(cyclopentadienyldimethylsilyl)cyclopentadienyl]nickel,
bis(indenyl)nickel,
$(CH_2=CHCH_2)_2Ni$,
$CH_2=CHCH_2NiP(C_6H_5)_3Cl$,
$CH_2=C(CH_3)CH_2]_2Ni$,
$(CH_3CH=CHCH_2)_2Ni$,
$(C_6H_5CH=CHCH_2)_2Ni$,
$(C_6H_9)_2Ni$,
$(C_6H_{13})_2Ni$,
$(CH_2=CHCH_2NiBr)_2$,
$(CH_2=CHCH_2NiCl)_2$,
$(CH_2=CHCH_2NiI)_2$, $[C_6H_5C\overline{C(C_6H_5)C(C_6H_5)}Ni(CO)Br]_2$,
$]C_6H_5\overline{CC(C_6H_5)C(C_6H_5)}Ni(CO)Cl]_2$
$CH_2=C(CH_3)CH_2NiP(C_6H_5)_3Cl$,
bis(benzene)nickel-aluminum chloride complex, i.e., $(C_6H_6)_2Ni\cdot 5AlCl_3$,
bis(acrolein)nickel,
bis(acrylonitrile)nickel,
bis(fumaronitrile)nickel,
bis(cinnamonitrile)nickel
(benzylidenemalononitrile)nickel, $[o\text{-}C_6H_4C_6H_4C=C(CN)_2]Ni$,
[(diphenylmethane)malononitrile]nickel,
(phenylethynetricarbonitrile)nickel,
$(C_2H_4)Ni[P(C_2H_5)_3]_2$,
$(C_2H_4)Ni[P(N(CH_2CH_2)_2O)_3]_2$,
$(C_2H_4)Ni(P[\overline{N(CH_3)_4CH_2}]_3)_2$,
$(C_2H_4)Ni[P(C_6H_5)_3]_2$,
$(C_2H_4)Ni[P(C_6H_{11})_3]_2$,
$(C_2H_4)Ni[P(OC_6H_4\text{-}OCH_3\text{-}o)_3]_2$,
$(C_2H_4)Ni[P(OC_6H_4C_6H_5\text{-}o)_3]_2$, (C₆H₅CH=CH₂)Ni[P(C₆H₅)₃]₂,
[C₆H₅C(CH₃)=CH₂]Ni[P(C₆H₅)₃]₂,
(C₆H₅CH=CHC₆H₅)Ni[P(C₆H₅)₃]₂,
(CH₂=CHCHO)₂Ni[P(C₆H₅)₃]₂,
(CH₂=CHCN)₂Ni[P(C₆H₅)₃],
(CH₂=CHCN)₂Ni[P(C₆H₅)₃]₂,
(1,5-cyclooctadiene)Ni[P(C₆H₅)₃]₂,
(CF₃C₆H₅)₂Ni,
(CH₃C₆H₅)₂Ni,
(C₆H₅C=C(C₆H₅)C(C₆H₅)=C(C₆H₅)CO]₂Ni,
(C₈H₁₂)₂Ni,
(C₈H₁₂)Ni,
(C₈H₈)Ni,
(C₁₂H₁₆)Ni,
dicarbonylbis(1,1,2-trifluorooctene)nickel,
(7-sec-butyl-1,4-dimethylazulene)dicarbonylnickel,
tris(stilbene)nickel,
dicarbonyl(hexafluoro-2-butyne)nickel,
2-butynebis(triphenylphosphine)nickel,
(diphenylacetylene)bis(triphenylphosphine)nickel,
(CH₃NC)Ni(CO)₃,
(C₂H₅NC)Ni(CO)₃,
(C₄H₉NC)Ni(CO)₃,
(C₂H₅NC)₂Ni(CO)₂,
(CH₃NC)₃Ni(CO),
(C₂H₅NC)₃Ni(CO),
(C₄H₉NC)₃Ni(CO),
(CH₃NC)₄Ni,
(p-ClC₆H₄NC)₄Ni,
(C₆H₅NC)₄Ni,
(p-CH₃C₆H₄NC)₄Ni,
(p-C₂H₅C₆H₄NC)₄Ni,
(β-C₁₀H₇NC)₄Ni,
(C₂H₅C₅H₄)Ni(CO)Pb(CH₃)₂Br,
(C₂H₅C₅H₄)Ni(CO)Na,
(C₂H₅C₅H₄)Ni(CO)PbBr₃,
(C₂H₅C₅H₅)Ni(CO)SnF₃.

Preparations for these organonickel compounds may be found in "Organometallic Compounds," vol. 1, Compounds of Transition Metals, edited by Michael Dub, published by Springer-Verlag, New York, Inc., 1966.

The organonickel compounds or nickel carbonyl, etc., as defined above react with the triaryl phosphite to form at least some tetrakis (triaryl phosphite) nickel (O), of which the presence of only a very small amount is necessary at any one time, to catalyze the hydrocyanation reaction.

This invention can involve the use of a promoter to activate the catalyst. A very large number of compounds are suitable for use as promoters. The promoter acts to improve the catalyst performance and in certain cases such as the hydrocyanation of 3- or 4-pentenenitrile to adiponitrile, results in an improved isomer distribution. The amount of promoter used may be varied from a 1:16 to 16:1 molar ratio of promoter to nickel. The promoter generally is a boron compound or a cationic form of a metal selected from the class consisting of zinc, cadmium, beryllium, aluminum, gallium, indium, thallium, titanium, zirconium, hafnium, erbium, germanium, tin, vanadium, niobium, scandium, chromium, molybdenum, tungsten, manganese, rhenium, palladium, thorium, iron, and cobalt. The preferred boron compounds are borohydrides and organoboron compounds of which the preferred borohydrides are the alkali metal borohydrides and the quaternary ammonium borohydrides particularly the tetra-(lower alkyl) ammonium borohydrides. Of these, sodium borohydride and potassium borohydride are especially preferred. Other suitable promoters are normally salts of the metals listed above and include aluminum chloride, zinc chloride, cadmium iodide, titanium trichloride, titanium tetrachloride, zinc acetate, ethylaluminum dichloride, ethylaluminum sesquichloride, chromic chloride, stannous chloride and zinc iodide. The promoter may be used according to several techniques. Thus, while the promoter preferably is added to the reaction mixture at the start of the reaction, it can be added at a point in time during the reaction when the activity of the catalyst has diminished somewhat. Use of a promoter is not necessary in carrying out the present invention, however sometimes such use of a promoter is preferred. Improved isomer distribution can be obtained through the use of excess ligand whether or not promoter is used.

The hydrocyanation reaction may be carried out by charging a reactor with all of the reactants or preferably the reactor is charged with the catalyst, or catalyst components, the unsaturated compound and whatever solvent is to be used, if any, and the hydrogen cyanide gas is swept over the surface of the reaction mixture or bubbled through said reaction mixture. If desired, when using a gaseous unsaturated organic compound, the hydrogen cyanide and the unsaturated organic compound may be fed together into the reaction medium. The ratio of olefin to nickel generally may be from about 10:1 to 2000:1. When using a fixed-bed-catalyst type operation, a much higher proportion of catalyst such as 1:2 unsaturated compound to catalyst is used.

Preferably, the reaction medium is agitated, such as by stirring or shaking. The cyanated product can be recovered by conventional techniques such as by distillation. The reaction may be run either batchwise or in a continuous manner.

The hydrocyanation reaction can be carried out with or without a solvent. The solvent should be liquid at the reaction temperature and pressure and should not exert any deleterious effect towards the unsaturated compound and the catalyst. Generally, such solvents are hydrocarbons such as benzene or xylene, or nitriles such as acetonitrile. In many cases, the ligand may serve as part or all of the solvent.

If desired, certain ethers can be added to the reaction mixture. These ethers act to produce an improved yield and generally higher cycles particularly in the production of adiponitrile from 3-pentenenitriles or 4-pentenenitrile. This influence is generally greatest at temperatures of from about 20 to 75° C. Up to 75 volume percent of ether is used as based on the total reaction mixture. These ethers may be cyclic or acyclic and may contain from 1 to 5 ether linkages between lower alkylene radicals or arylene radicals and in the case of acyclic ethers are capped with lower alkyl groups. These ethers include dioxane, trioxane, CH₃—O—CH₂—CH₂—O—CH₃,

CH₃—O—CH₂—CH₂—O—CH₂—CH₂—O—CH₃ o-dimethoxybenzene, etc.

The exact temperature which is preferred is dependent to a certain extent on the particular catalyst being used, the particular unsaturated compound being used and the desired rate. Generally, temperatures of from —25 to 300° C. can be used with from 0 to 150° C. being preferred.

Atmospheric pressure is satisfactory for carrying out the present invention and, hence, pressures of from about 0.7 to 20 atmospheres are preferred due to the obvious economic considerations although pressures of from 0.3 to 100 atmospheres could be used if desired.

The nitriles formed by the present invention are useful as chemical intermediates. For instance, adiponitrile is an intermediate used in the production of hexamethylene diamine which is used in the production of polyhexamethylene adipamide, a commercial polyamide useful in forming fibers, films and molded articles. Other nitriles can be used to form the corresponding acids and amines which are conventional commercial products.

DESCRIPTION OF THE PREFERRED EMBODIMENTS

Example I

The following reagents are charged into a stirred 50 ml. flask which was held at 120° C. by controlling the temperature of the liquid which is circulated through a jacket surrounding the reactor. The flask which is closed to the atmosphere is flushed initially with dry $N_2$, and an oxygen free atmosphere is maintained in the reactor during the experiment.

33.4 g. (4.12 mmoles) 3-pentenenitrile
7.5 g. (5.77 mmoles) tetrakis[triphenylphosphite] nickel (O)
10.8 g. (34.9 mmoles) triphenylphosphite Liquid HCN is pumped into the above solution at a rate of one millimole of HCN per minute from a syringe by means of a calibrated, precision syringe pump. The HCN flow is stopped and the reactor contents removed for analysis after 23.1 millimoles of HCN have been delivered (HCN/Ni ratio=4). The catalyst is still performing effectively at shutdown.

The reaction mixture is filtered under a $N_2$ blanket while still hot in order to recover solids formed during the reaction. The filtrate is allowed to cool in order for $Ni[P(OC_6H_5)_3]_4$ to precipitate. The $Ni[P(OC_6H_5)_3]_4$ is recovered by filtration. The reaction solids are analyzed for Ni content. The final filtrate is analyzed for Ni and mono- and dinitriles.

In order to serve as a control, the experiment is repeated exactly like the one just described except that the excess ligand is omitted. The results are compared below:

| Remarks | No excess ligand | Excess ligand |
| --- | --- | --- |
| I. Nickel balance in millimoles: | | |
| A. Introduced as $Ni[(POC_6H_5)_3]_4$ | 5.77 | 5.77 |
| B. Accounted for after run: | | |
| (1) In reaction solids [1] | 3.48 | 1.08 |
| (2) In recovered $Ni[P(OC_6H_5)_3]_4$ | 1.58 | 4.44 |
| (3) Ni soluble in filtrate | 0.50 | 0.53 |
| C. Total accounted for | 5.56 | 6.05 |
| D. Percent accounted for | 96 | 105 |
| II. Products in filtrate (in mmoles): | | |
| Adiponitrile (ADN) | 9.57 | 3.45 |
| Ethylsuccinonitrile | .63 | .24 |
| 2-methylglutaronitrile | 3.30 | .72 |
| 2-methyl-2-butenenitriles | 2.16 | |
| cis-2-pentenenitrile | 16.70 | 5.24 |
| trans-2-pentenenitrile | 11.50 | 4.41 |
| Valeronitrile | 2.17 | |
| Total 3-pentenenitrile converted | 46.03 | 14.06 |
| III. Ratios: | | |
| A. ADN produced/ spent Ni in reaction solids | 2.8 | 3.2 |
| B. ADN produced/ 3-pentenenitrile converted | .21 | .25 |
| C. ADN produced/ Total dinitriles produced | .71 | .78 |

[1] Nickel present here is mainly in the form of $Ni(CN)_2$ and is inactive.

Based on the amount of adiponitrile formed, the results demonstrate that operation in the presence of excess ligand gives less catalyst decomposition and less by-products derived from 3-pentenenitriles.

Example II

A mixture of 20 g. of 3-pentenenitrile and 2.2 g. of triphenylphosphite is charged to a 100 ml., glass flask, and the system is purged with nitrogen. To the mixture is added 0.9 ml. of liquid nickel tetracarbonyl. When evolution of gas stops, 0.2 g. of sodium borohydride is added and the mixture is heated to 120° C. Hydrogen cyanide gas is swept across the surface by a nitrogen carrier gas. Temperature of the reaction mixture increases rapidly to 126° C., then falls slowly to 117° C.

At this time, gas chromatographic analysis shows that the sample contains 15.6 percent adiponitrile, 5.3 percent 2-methylglutaronitrile, and 2.7 percent ethylsuccinonitrile.

An additional 0.2 g. of sodium borohydride is added and hydrogen cyanide addition is continued. A total of 9 ml. of liquid hydrogen cyanide is added over a 100 minute period. At this time the crude product contains 21.9 percent adiponitrile, 7.6 percent 2-methylglutaronitrile, and 3.8 percent ethylsuccinonitrile.

Example III

A mixture of 20 g. of 3-pentenenitrile and 3.8 g. of phenyl diphenylphosphinite is charged to a 100 ml., glass flask and the system is purged with nitrogen. To the mixture is added 1 ml. of nickel tetracarbonyl. When the vigorous evolution of gas stops, 0.2 g. of sodium borohydride is added and the mixture is heated to 120° C. Hydrogen cyanide gas is swept across the surface of the stirred mixture by a nitrogen carrier gas. A total of about 9 ml. of liquid hydrogen cyanide is added.

Gas chromatographic analysis shows that the crude sample contains 32.7 percent adiponitrile, 6.4 percent 2-methylglutaronitrile and 1.7 percent ethylsuccinonitrile.

Example IV

A 50 ml., three-necked, round bottom flask fitted with a reflux condenser connected to a Dry Ice trap, an inlet and a magnetic stirrer, is set up in an oil bath maintained at 115° C., and purged with dry, deoxygenated nitrogen. The flask is charged with 0.65 g. (0.0005 mole) of

followed by 1.7 g. (0.01 mole) of tributylborane, 3.10 g. (0.01 mole) of $P(OC_6H_5)_3$ and 76.2 g. (0.2 mole) of 3-pentenenitrile. A stream of dry, deoxygenated nitrogen gas is bubbled through 10 ml. of liquid hydrogen cyanide contained in a 20 ml. receiver cooled in an ice bath. The nitrogen gas flow is adjusted to 20 ml. of nitrogen per minute. The resulting gas mixture is passed through a bed of phosphorus pentoxide to eliminate traces of moisture and then is swept across the surface of the reaction mixture in the flask. After 5 hours, the reaction is shut down.

Gas chromatographic analysis indicates that 14.7 percent of the 3-pentenenitrile is converted to dinitriles and that of the dinitriles produced 89 percent is adiponitrile. The number of cycles (ratio of dicyanobutanes produced to catalyst charged) is 50.6.

Example V

A 50 ml., three-necked, round bottom flask fitted with a reflux condenser connected to a Dry Ice trap, an inlet, and a magnetic stirrer, is set up in an oil bath maintained at 125° C., and purged with dry, deoxygenated nitrogen. The flask is charged with 0.82 ml. of a one molar solution of $(C_2H_5)_2AlCl$ [$18.2\times10^{-4}$ mole $(C_2H_5)_2AlCl$], 0.82 ml. of a one molar solution of $C_2H_5AlCl_2$ in cyclohexane $8.2\times10^{-4}$ mole $C_2H_5AlCl_2$) followed by 3.46 ml. ($1.31\times10^{-2}$ mole) of $P(OC_6H_5)_3$, 20.3 g. (0.25 mole) of 3-pentenenitrile, and 2.29 g. ($1.64\times10^{-3}$ mole) of

A stream of dry, deoxygenated nitrogen gas is bubbled through 4.0 ml. of liquid hydrogen cyanide contained in a 20 ml. receiver cooled in an ice bath. An additional 5.5 ml. of hydrogen cyanide is added to the receiver 90 minutes after start up and an additional 3.5 ml. when the reaction is restarted as set forth below. The nitrogen gas flow is adjusted to give a hydrogen cyanide feed rate of about 2 ml. (as measured at 0° C.) of liquid hydrogen cyanide per hour. The resulting gas mixture is passed through a bed of phosphorus pentoxide to eliminate traces of moisture and then is swept across the surface of the reaction mixture in the flask. After 1 hour and 50 minutes, the reaction is shut down. After 15 hours and 25 minutes, the bath is reheated to 126° C. and the reaction continued for an additional 2 hours and 25 minutes after which the reaction is shut down.

Gas chromatographic analysis indicates that 49.6 percent of the 3-pentenenitrile is converted to dinitriles and that of the 3-pentenenitrile converted 62.6 percent is adiponitrile, 28.9 percent is 2-methylglutaronitrile and 8.6 percent is ethylsuccinonitrile. The number of cycles (ratio of dicyanobutanes produced to catalyst charged) is 75.7.

Example VI

A 50 ml., three-necked, round bottom flask fitted with a reflux condenser connected to a Dry Ice trap, an inlet and a magnetic stirrer, is set up in an oil bath maintained at $129 \pm 1°$ C., and purged with dry, deoxygenated nitrogen. The flask is charged with 0.219 g. ($1.64 \times 10^{-3}$ mole) of $AlCl_3$ followed by 4.06 g. ($1.31 \times 10^{-2}$ mole) of $P(OC_6H_5)_3$, 20.3 g. (0.25 mole) of 3-pentenenitrile, and 2.29 g. ($1.64 \times 10^{-3}$ mole) of $Ni[P(OC_6H_5)_3]_4$. A stream of dry, deoxygenated nitrogen gas is bubbled through 4.8 ml. of liquid hydrogen cyanide contained in a 20 ml. receiver cooled in an ice bath. The nitrogen gas flow is adjusted to 30–35 ml. of nitrogen per minute to give a total hydrogen cyanide consumption 6.8 ml. (as measured at 0° C.) of liquid hydrogen cyanide. The resulting gas mixture is passed through a bed of phosphorus pentoxide to eliminate traces of moisture and is then swept across the surface of the reaction mixture in the flask. After 6 and one-half hours, the reaction is shut down.

Gas chromatographic analysis indicates that 31.5 percent of the 3-pentenenitrile is converted to dinitriles and that of the 3-pentenenitrile converted 65.6 percent is adiponitrile, 29.4 percent is 2-methylglutaronitrile and 4.9 percent is ethylsuccinonitrile. The number of cycles (ratio of dicyanobutanes produced to catalyst charged) is 48.1.

Example VII

A 50 ml., three-necked, round bottom flask fitted with a reflux condenser connected to a Dry Ice trap, an inlet and a magnetic stirrer, is set up in an oil bath maintained at 80° C., and purged with dry, deoxygenated nitrogen. The flask is charged with 0.450 g. (0.001 mole) of $GaI_3$ followed by 0.650 g. (0.0005 mole) of $Ni[P(OC_6H_5)_3]_4$, 20.0 g. (0.247 mole) of 3-pentenenitrile, and 3.1 g. (0.01 mole) of $P(OC_6H_5)_3$. A stream of dry, deoxygenated nitrogen gas is bubbled through 10 ml. of liquid hydrogen cyanide contained in a 20 ml. of receiver cooled in an ice bath. The nitrogen gas flow is adjusted to 10 ml. of nitrogen per minute to give a hydrogen cyanide feed rate of about 0.5 ml. (as measured at 0° C.) of liquid hydrogen cyanide per hour. The resulting gas mixture is passed through a bed of phosphorus pentoxide to eliminate traces of moisture and then is swept across the surface of the reaction mixture in the flask. After 6 and one-half hours, the reaction is shut down.

Gas chromatographic analysis indicates that of the dinitriles produced, 43 percent is adiponitrile, 35.3 percent is 2-methylglutaronitrile and 20.9 percent is ethylsuccinonitrile. The number of cycles (ratio of dicyanobutanes produced to catalyst charged) is 84.

Example VIII

A 50 ml., three-necked, round bottom flask fitted with a reflux condenser connected to a Dry Ice trap, an inlet, and a magnetic stirrer, is set up in an oil bath maintained at 115° C. and purged with dry, deoxygenated nitrogen. The flask is charged with 3.50 g. (0.001 mole) of $Zn[HPO_3]_2$, followed by 6.50 g. (0.0005 mole) of $Ni[P(OC_6H_5)_3]_4$, 16 g. (0.2 mole) of 3-pentenenitrile, and 3.1 g. (0.01 mole) of $P(OC_6H_5)_3$. A stream of dry, deoxygenated nitrogen gas is bubbled through 10 ml. of liquid hydrogen cyanide contained in a 20 ml. receiver cooled in an ice bath. The nitrogen gas flow is adjusted to 10 ml. of nitrogen per minute to give a hydrogen cyanide feed rate of about 0.5 ml. (as measured at 0° C.) of liquid hydrogen cyanide per hour. The resulting gas mixture is passed through a bed of phosphorus pentoxide to eliminate traces of moisture and then is swept across the surface of the reaction mixture in the flask. After six and one-half hours, the reaction is shut down.

Gas chromatographic analysis indicates that 64.5 percent of the 3-pentenenitrile is converted to dinitriles and that of the 3-pentenenitrile converted, 73.2 percent is adiponitrile, and 26.8 percent is 2-methylglutaronitrile and ethylsuccinonitrile. The number of cycles (ratio of dicyanobutanes produced to catalyst charged) is 242.

Example IX

A 50 ml., three-necked, round bottom flask fitted with a reflux condenser connected to a Dry Ice trap, an inlet, and a magnetic stirrer, is set up in an oil bath maintained at 115° C. and purged with dry, deoxygenated nitrogen. The flask is charged with 2.19 g. (0.001 mole) of $Zn(CH_3COO)_2 \cdot 2H_2O$ followed by 0.650 g. (0.0005 mole) of $Ni[P(OC_6H_5)_3]_4$, 20 g. (0.25 mole) of 3-pentenenitrile, and 3.1 g. (0.01 mole) of $P(OC_6H_5)_3$. A stream of dry, deoxygenated nitrogen gas is bubbled through 10 ml. of liquid hydrogen cyanide contained in a 20 ml. receiver cooled in an ice bath. The nitrogen gas flow is adjusted to 20 ml. of nitrogen per minute to give a gaseous hydrogen cyanide feed rate equivalent to about 1.0 ml. measured at 0° C. of liquid hydrogen cyanide per hour. The resulting mixture of gases is passed through a bed of phosphorus pentoxide to eliminate traces of moisture and then is swept across the surface of the reaction mixture in the flask. After three hours, the reaction is shut down.

Gas chromatographic analysis indicates a yield of 16.2 g. of adiponitrile (79 percent as based on 3-pentenenitrile converted) and 4.4 g. of 2-methylglutaronitrile. The number of cycles is 92.

Example X

A 50 ml., three-necked, round bottom flask fitted with a reflux condenser connected to a Dry Ice trap, an inlet, and a magnetic stirrer, is set up in an oil bath maintained at 80° C., and purged with dry, deoxygenated nitrogen. The flask is charged with 0.10 g. (0.0004 mole) of zinc bromide followed by 0.325 g. (0.00025 mole) of $Ni[P(OC_6H_5)_3]_4$, 20 g. (0.247 mole) of 3-pentenenitrile, and 0.1 g. (0.01 mole) of $P(OC_6H_5)_3$. A stream of dry, deoxygenated nitrogen gas is bubbled through 10 ml. of liquid hydrogen cyanide contained in a 20 ml. receiver cooled in an ice bath. The nitrogen gas flow is adjusted to give a hydrogen cyanide feed rate of about 0.4 ml. (as measured at 0° C.) of liquid hydrogen cyanide per hours. The resulting gas mixture is passed through a bed of phosphorus pentoxide to eliminate traces of moisture and then is swept across the surface of the reaction mixture in the flask. After 7 hours, the reaction is shut down.

Gas chromatographic analysis indicatives that 79.5 percent of the 3-pentenenitrile is converted to dinitriles and that of the 3-pentenenitrile converted 82 percent is adiponitrile, 15.3 percent is 2-methylglutaronitrile and 2.3 percent is ethylsuccinotrile. The number of cycles (ratio of dicyanobutanes produced to catalyst charged) is 271.

Example XI

A 50 ml., three-necked, around bottom flask fitted with a reflux condenser connected to a Dry Ice trap, an inlet, and a magnetic stirrer, is set up in an oil bath maintained at $90 \pm 3°$ C., and purged with dry, deoxygenated nitrogen. The flask is charged with 0.437 g. (0.0015 mole) of Zn(CF$_3$COO)$_2$ followed by 1.40 g. (0.001 mole) of Ni[P(OC$_6$H$_5$)$_3$]$_4$, 39.1 ml. (0.4 mole) of 3-pentenenitrile, and 3.4 ml. (0.01 mole) of P(OC$_6$H$_5$)$_3$. A stream of dry, deoxygenated nitrogen gas is bubbled through liquid hydrogen cyanide contained in a 20 ml. flask cooled in an ice bath. The nitrogen gas flow is adjusted to 28 ml. of nitrogen per minute. The resulting gas mixture is passed through a bed of phosphorus pentoxide to eliminate traces of moisture and then is swept across the surface of the reaction mixture in the flask. After 17 hours and 52 minutes, the reaction is shut down.

Gas chromatographic analysis indicates that 47.3 percent of the 3-pentenenitrile is converted to dinitriles and that of the dinitriles produced 80.5 percent is adiponitrile, 15.8 percent is 2-methylglutaronitrile and 3.7 percent is ethylsuccinonitrile. The number of cycles (ratio of dicyanonbutanes produced to catalyst charged) is 189.

Example XII

A 50 ml., three-necked, round bottom flask fitted with a reflux condenser, connected to a Dry Ice trap, an inlet, and a magnetic stirrer, is set up in a oil both maintained at 90° C., purged with dry, deoxygenated nitrogen. The flask is charged with 0.300 g. (0.0008 mole) of cadmium iodide followed by 0.650 g. (0.0005 mole) of

N[P(OC$_6$H$_5$)$_3$]$_4$ 20 g. (0.25 mole) of 3-pentenenitrile, and 3.1 g. (0.01 mole) of P(OC$_6$H$_5$)$_3$. A stream of dry, deoxygenated nitrogen gas is bubbled through 10 ml. of liquid hydrogen cyanide contained in a 20 ml. receiver cooled in an ice bath. The nitrogen gas flow is adjusted to give a hydrogen cyanide feed rate of about 0.5 ml. (as measured at 0° C.) of liquid hydrogen cyanide per hour. The resulting gas mixture is passed through a bed of phosphorus pentoxide to eliminate traces of moisture and then is swept across the surface of the reaction mixture in the flask. After 6½ hours, the reaction is shut down.

Gas chromatographic analysis indicates that 29.6 percent of the 3-pentenenitrile is converted to dinitriles and that of the 3-pentenenitrile converted 84.3 percent is adiponitrile, 13.4 percent is 2-methylglutaronitrile and 2.2 percent is ethylsuccinonitrile. The number of cycles (ratio of dicyanobutanes produced to catalyst charged) is 148.

Examples XIII

A 50 ml., three-necked, round bottom flask fitted with a reflux condenser connected to a Dry Ice trap, an inlet, and a magnetic stirrer, is set up in an oil bath maintained at 90° C., and purged with dry, deoxygenated nitrogen. The flask is charged with 0.15 g. (0.0005 mole) of zinc iodide followed by 0.325 g. (0.00025 mole) of Ni[P(OC$_6$H$_5$)$_3$]4, 20 g. (0.25 mole) of 3-pentenenitrile, and 3.1 g. (0.01 mole) of P(OC$_6$H$_5$)$_3$. A stream of dry, deoxygenated nitrogen gas is bubbled through 10 ml. of liquid hydrogen cyanide contained in a 20 ml. receiver cooled in an ice bath. The nitrogen gas flow is adjusted to 10 ml. of nitrogen per minute to give a hydrogen cyanide feed rate of about 0.5 ml. (as measured at 0° C.) of liquid hydrogen cyanide per hour. The resulting gas mixture is passed through a bed of phosphorus pentoxide to eliminate traces of moisture and then is sewept across the surface of the reaction mixture in the flask. After 12 hours the reaction is shut down.

Gas chromatographic analysis indicates that 44.5 percent of the 3-pentenenitrile is converted to dinitriles and that of the 3-pentenenitrile converted 83.5 percent is adiponitrile, 14.2 percent is 2-methylglutaronitrile and 2.3 percent is ethylsuccinonitrile. The number of cycles (ratio of dicyanobutanes produced to catalyst charged) is 435.

Example XIV

A 50 ml., three-necked, round bottom flask fitted with a reflux condenser connected to a Dry Ice trap, an inlet, and a magnetic stirred, is set up in an oil bath maintained at 80° C., and purged with dry, deoxygenated nitrogen. The flask is charged with 0.287 g. (0.001 mole) of ZnSO$_4$·7H$_2$O followed by 0.650 g. (0.0005 mole) of Ni[P(OC$_6$H$_5$)$_3$]$_4$, 20.0 g. (0.25 mole) of 3-pentenenitrile, and 3.1 g. (0.01 mole) of P(OC$_6$H$_5$)$_3$. A stream of dry, deoxygenated nitrogen gas is bubbled through 10 ml. of liquid hydrogen cyanide contained in a 20 ml. receiver cooled in an ice bath. The nitrogen gas flow is adjusted to 10 ml. of nitrogen per minute to give a gaseous hydrogen cyanide feed rate equivalent to about 0.5 ml. (as measured at 0° C.) of liquid hydrogen cyanide per hour. The resulting gas mixture is passed through a bed of phosphorus pentoxide to eliminate traces of moisture and then is swept across the surface of the reaction mixture in the flask. After 6 hours, the reaction is shut down.

Gas chromatographic analysis indicates that 2.2 percent of the 3-pentenenitrile is converted to dinitriles and that of the 3-pentenenitrile converted 79.0 percent is adiponitrile, 20.8 percent is 2-methylglutaronitrile and 0.2 percent is ethylsuccinonitrile. The number of cycles (ratio of dicyanobutanes produced to catalyst charged) is 110.

Example XV

A 50 ml., three-necked, round bottom flask fitted with a reflux condenser connected to a Dry Ice trap, an inlet, and a magnetic stirrer, is set up in an oil bath maintained at 110° C., and purged with dry, deoxygenated nitrogen. The flask is charged with 0.6 g. (0.0005 mole) of Ni[P(OC$_6$H$_5$)$_3$]$_4$, 0.242 g. (0.001 mole) of B(C$_6$H$_5$)$_3$, 12 g. (0.15 mole) of 3-pentenenitrile, and 3.1 g. (0.01 mole) of P(OC$_6$H$_5$)$_3$. A stream of dry, deoxygenated nitrogen gas is bubbled through 10 ml. of liquid hydrogen cyanide contained in a 20 ml. flask cooled in an ice bath. The nitrogen gas flow is adjusted to 20 ml. of nitrogen per minute to give a hydrogen cyanide feed rate of about 0.4 ml. (as measured at 0° C.) of liquid hydrogen cyanide per hour. The resulting gas mixture is passed through a bed of phosphorus pentoxide to eliminate traces of moisture and then is swept across the surface of the reaction mixture in the flask. After 2 hours, the reaction is shut down.

Gas chromatographic analysis indicates that of the 3-pentenenitrile converted to dinitriles 92 percent is adiponitrile. The number of cycles (ratio of dicyanobutanes produced to catalyst charged) is 48.

Example XVI

A 50 ml., three-necked, round bottom flask fitted with a reflux condenser connected to a Dry Ice trap, an inlet, and a magnetic stirrer, is set up in an oil bath maintained at 80° C., and purged with dry, deoxygenated nitrogen. The flask is charged with 0.650 (0.005 mole) of Ni[P(OC$_6$H$_5$)$_3$]$_4$, followed by 0.820 g. (0.002 mole) of B(m-C$_6$H$_4$CF$_3$)$_3$, 3.1 g. (0.01 mole) of P(OC$_6$H$_5$)$_3$, and 20.0 g. (0.25 mole) of 3-pentenenitrile. A stream of dry, deoxygenated nitrogen gas is bubbled through 10 ml. of liquid hydrogen cyanide contained in a 20 ml. flask cooled in an ice bath. The resulting gas mixture is passed through a bed of phosphorus pentoxide to eliminate traces of moisture and then is swept across the surface of the reaction mixture in the flask. After 5 hours, the reaction is shut down.

Gas chromatographic analysis indicates that of the 3-pentenenitrile converted to dinitriles, 78 percent is adiponitrile. The number of cycles (ratio of dicyanobutanes produced to catalyst charged) is 128.

Example XVIII

A 50 ml., three-necked, round bottom flask fitted with a reflux condenser connected to a Dry Ice trap, an inlet, and a magnetic stirrer, is set up in an oil bath maintained at 80° C., and purged with dry, deoxygenated nitrogen. The flask is charged with 0.325 g. (0.00025 mole) of Ni[P(OC$_6$H$_5$)$_3$]$_4$, followed by 0.100 g. (0.0004 mole)

of ZnBr$_2$, 3.1 g. (0.01 mole) of P(OC$_6$H$_5$)$_3$, and 20.0 g. (0.247 mole) of 3-pentenenitrile. A stream of dry, deoxygenated nitrogen gas is bubbled through 10 ml. of liquid hydrogen cyanide contained in a 20 ml. receiver cooled in an ice bath. The nitrogen gas flow is adjusted to give a hydrogen cyanide feed rate of about 0.4 ml. (as measured at 0° C.) of liquid hydrogen cyanide per hour. The resulting gas mixture is passed through a bed of phosphorus pentoxide to eliminate traces of moisture and then is swept across the surface of the reaction mixture in the flask. After 7 hours, the reaction is shut down.

Gas chromatographic analysis indicates that 25 percent of the 3-pentenenitrile is converted to dinitriles, and that of the dinitriles produced 82 percent is adiponitrile, 15.8 percent is 2-methylglutaronitrile and 2.4 percent is ethylsuccinonitrile. The number of cycles (ratio of dicyanobutane produced to catalyst charged) is 250.

Example XVIII

A mixture of 4.98 g. of Ni[P(OC$_6$H$_5$)$_3$]$_4$, 10.13 g. of P(OC$_6$H$_5$)$_3$, and 20.07 g. of 3-pentenenitrile is prepared in a 50 ml. round bottom flask equipped with a reflux condenser connected to a Dry Ice trap, an inlet, and cooled in an ice bath. Diborane (B$_2$H$_6$) is passed into the stirred mixture at 4–8° C. at a rate of 5 ml. per minute for 12 minutes. The mixture is warmed to room temperature and placed in an oil bath maintained at about 112° C. A stream of dry, deoxygenated nitrogen gas is bubbled through liquid hydrogen cyanide at a rate of 20 ml. per minute to give a total hydrogen cyanide feed rate of 1.16 ml. (as measured at 0° C.) of liquid hydrogen cyanide per hour. After 6 hours, the run is shut down for 63 hours and then started up and run for an additional 2 hours and 53 minutes.

Gas chromatographic analysis indicates that of the 3-pentenenitrile converted to dinitriles 88.3 percent is adiponitrile, 9.9 percent is 2-methylglutaronitrile, and 1.9 percent is ethylsuccinonitrile. The number of cycles (ratio of dicyanobutanes produced to catalyst charged) is 44.

Example XIX

A 50 ml., three-nicked, round bottom flask fitted with a reflux condenser connected to a Dry Ice trap, an inlet, and a magnetic stirrer, is set up in an oil bath heated to about 94° C. The flask is purged with dry, deoxygenated nitrogen and charged with 0.231 g. (0.001 mole) of

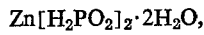

Zn[H$_2$PO$_2$]$_2$·2H$_2$O, followed by 0.650 g. (0.0005 mole) of Ni[P(OC$_6$H$_5$)$_3$]$_4$, 20 g. (0.25 mole) of 3-pentenenitrile, and 3.1 g. (0.01 mole) of P(OC$_6$H$_5$)$_3$. The temperature of the oil bath is gradually increased from 94 to 119° C. over a period of 11¼ hours, which maintains the temperature of the reaction mixture close to 110° C. for most of the reaction period. A stream of dry, deoxygenated nitrogen gas is bubbled through 10 ml. of liquid hydrogen cyanide contained in a 20 ml. flask, cooled in an ice bath. The hydrogen cyanide is replenished as needed. The nitrogen gas flow is adjusted to 10 ml. of nitrogen per minute to give a gaseous hydrogen cyanide feed rate equivalent to about 0.5 ml. (as measured at 0° C.) of liquid hydrogen cyanide per hour. The resulting gas mixture is passed through a bed of phosphorus pentoxide to eliminate traces of moisture and then is swept across the surface of the reaction mixture in the flask. After 11¼ hours, the reaction is shut down.

Gas chromatographic analysis indicates that 41 percent of the 3-pentenenitrile is converted to dinitriles and that of the dinitriles produced 75.1 percent is adiponitrile, 21.3 percent is 2-methylglutaronitrile, and 2.7 percent is ethylsuccinonitrile. The number of cycles is 183.

Example XX

A 50 ml., three-nicked, round bottom flask fitted with a reflux condenser connected to a Dry Ice trap, an inlet, and a magnetic stirrer, is set up in an oil bath maintained at 40–41° C., and purged wtih dry, deoxygenated nitrogen. The flask is charged with 0.0511 g. (3.75×10$^{-4}$ mole) of ZnCl$_2$, 14.6 ml. (0.15 mole) of 3-pentenenitrile, 14.6 ml. of dioxane (freshly dried on acid alumina), 0.81 ml. (3×10$^{-3}$ mole) of (p-CH$_3$C$_6$H$_4$O)$_3$P and 0.440 g. (3×10$^{-4}$ mole) of Ni[(p-CH$_3$C$_6$H$_4$O)$_2$P]$_4$. A stream of dry, deoxygenated nitrogen gas is bubbled through 8.8 ml. of liquid hydrogen cyanide contained in a 20 ml. flask cooled in an ice bath. The resulting gas mixture is passed through a bed of phosphorus pentoxide to eliminate traces of moisture and then is swept across the surface of the reaction mixture in the flask. After 16 hours and 35 minutes, the reaction is shut down. During this time period, 7.7 ml. of liquid hydrogen cyanide is fed to the reactor.

Gas chromatographic analysis indicates that 60.8 percent of the 3-pentenenitriles is converted and that of the 3-pentenenitrile converted, 84.5 perecnt is adiponitrile, 11.8 percent is 2-methylglutaronitrile, 1.01 percent is ethylsuccinonitrile and 2.27 percent is cis- and trans-2-pentenenitrile. The number of cycles is 288.

Example XXI

A 50 ml., three-necked, round bottom flask fitted with a reflux condenser connected to a Dry Ice trap, an inlet, and a magnetic stirrer, is set up in an oil bath maintained at 115° C., and purged with dry, deoxygenated nitrogen. The flask is charged with 0.352 g. (0.0019 mole) of Zn[HPO$_3$]$_2$, 20 g. (0.247 mole) of 3-pentenenitrile, 3.1 g. (0.01 mole) of P(OC$_6$H$_5$)$_3$, and 0.925 g. (0.0005 mole) of Ni[P(OC$_6$H$_4$Cl)$_3$]$_4$. A stream of dry, deoxygenated nitrogen gas at a rate of 15 ml. per minute is bubbled through liquid hydrogen cyanide contained in a 20 ml. flask cooled in an ice bath. The resulting gas mixture is passed through a bed of phosphorus pentoxide to eliminate traces of moisture and then is swept across the surface of the reaction mixture in the flask. After 3 hours and 50 minutes, the reaction is shut down.

Gas chromatographic analysis indicates that 17 percent of the 3-pentenenitrile is converted to dinitriles and that of the 3-pentenenitrile converted, 70.6 percent is adiponitrile. The number of cycles is 77.

Example XXII

A 50 ml. three-necked, round bottom flask fitted with a reflux condenser connected to a Dry Ice trap, an inlet and a magnetic stirrer, is set up in an oil bath maintained at 81±3° C., and purged with dry, deoxygenated nitrogen. The flask is charged with 0.254 g. (2.6×10$^{-4}$ mole) of Zn(OSO$_2$C$_7$F$_{15}$)$_2$ followed by 29.2 ml. (0.3 mole) of 3-pentenenitrile, 0.785 ml. (3×10$^{-3}$ mole) of P(OC$_6$H$_5$)$_3$, and 0.420 g. (3×10$^{-4}$ mole) of NiP[(OC$_6$H$_5$)$_3$]$_4$. A stream of dry, deoxygenated nitrogen gas is bubbled through liquid hydrogen cyanide contained in a 20 ml. flask cooled in an ice bath. The hydrogen cyanide is replenished as needed. The nitrogen gas flow is adjusted to 15 ml. of nitrogen per minute. The resulting gas mixture is passed through a bed of phosphorus pentoxide to eliminate traces of moisture and then is swept across the surface of the reaction mixture in the flask. After 6 hours and 40 minutes, the reaction is shut down.

Gas chromatographic analysis indicates that 17.2 percent of the 3-pentenenitrile is converted to dinitriles and that of the dinitriles produced, 73.7 percent is adiponitrile, 20.7 percent is 2-methylglutaronitrile and 5.7 percent is ethylsuccinonitrile. The number of cycles is 172.

Example XXIII

A 50 ml., three-necked, round bottom flask fitted with a reflux condenser connected to a Dry Ice trap, an inlet, and a magnetic stirrer, is set up in an oil bath maintained at 64±2° C., and purged with nitrogen. The flask is charged with 0.06 g. of InCl$_3$, followed by 25 ml. of 3-pentenenitrile, 0.7 ml. of P(OC$_6$H$_4$CH$_3$)$_3$ and 0.4 g. of Ni[P(OC$_6$H$_5$CH$_3$)$_3$]$_4$. A stream of nitrogen gas is bubbled through 8.8 ml. of liquid hydrogen cyanide contained in a 20 ml. flask cooled in an ice bath. The nitrogen gas flow is adjusted to 4 ml. of nitrogen per minute. The resulting gas mixture is swept across the surface of the reaction mixture in the flask. After 3 hours and 51 minutes, the reaction is shut down.

Gas chromatographic analysis indicates that the reaction mixture contains 4.0 percent adiponitrile, 1.1 percent 2-methylglutaronitrile and 0.3 percent ethylsuccinonitrile.

Example XXIV

A 50 ml., three-necked, round bottom flask fitted with a reflux condenser connected to a Dry Ice trap, a gas inlet, a thermometer, and a magnetic stirrer, is set up in an oil bath maintained at 130±2° C., and purged with nitrogen. The flask is charged with 0.18 ml. ($1.64 \times 10^{-3}$ mole) of liquid titanium tetrachloride followed by 4.06 g. ($1.32 \times 10^{-2}$ mole) of $P(OC_6H_5)_3$, 20.3 g. (0.25 mole) of 3-pentenenitrile, and 2.29 g. ($1.64 \times 10^{-3}$ mole) of $Ni[P(OC_6H_5)_3]_4$. A stream of nitrogen gas is bubbled through liquid hydrogen cyanide contained in a 20 ml. flask cooled in an ice bath. The nitrogen gas flow is adjusted to 38 ml. of nitrogen per minute to give a total hydrogen cyanide feed of 9 ml. (as measured at 0° C.) of liquid hydrogen cyanide. The resulting gas mixture is swept across the surface of the reaction mixture in the flask. After 3 hours and 13 minutes, the reaction is shut down.

Gas chromatographic analysis indicates that 15.8 percent of the 3-pentenenitrile is converted to dinitriles and that of 3-pentenenitrile so converted, 78.0 percent is adiponitrile, 16.7 percent is 2-methylglutaronitrile and 5.3 percent is ethylsuccinonitrile. The number of cycles (mole ratio of dicyanobutanes produced to catalyst charged) is 24.3.

Example XXV

A 50 ml., three-necked, round bottom flask fitted with a reflux condenser connected to a Dry Ice trap, an inlet, a thermometer, and a magnetic stirrer, is set up in an oil bath maintained at 65±2° C., and purged with nitrogen. The flask is charged with 0.21 g. ($4.5 \times 10^{-4}$ mole) of $Zr(C_5H_7O_2)_4$ followed by 0.81 ml. of

29.2 ml. (0.30343 mole) of 3-pentenenitrile, and 0.440 g. ($3 \times 10^{-4}$ mole) of

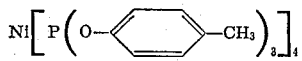

A stream of nitrogen gas is bubbled through liquid hydrogen cyanide contained in a 20 ml. flask cooled in an ice bath. The nitrogen gas flow is adjusted to 7 ml. of nitrogen per minute to give a total hydrogen cyanide feed of 1.2 ml. (as measured at 0° C.) of liquid hydrogen cyanide. The resulting gas mixture is swept across the surface of the reaction mixture in the flask. After 4 hours and 41 minutes, the reaction is shut down.

Gas chromatographic analysis indicates that 3.5 percent of the 3-pentenenitrile is converted to dinitriles and that of the 3-pentenenitrile so converted, 52.6 percent is adiponitrile, 31.2 percent is 2-methylglutaronitrile and 16.2 percent is ethylsuccinonitrile. The number of cycles (mole ratio of dicyanobutanes produced to catalyst charged) is 32.9.

Example XXVI

A 50 ml., three-necked, round bottom flask fitted with a reflux condenser connected to a Dry Ice trap, a gas inlet, a thermometer, and a magnetic stirrer, is set up in an oil bath maintained at 43±2° C., and purged with nitrogen. The flask is charged with 0.905 ml. of a 0.497 M solution ($4.5 \times 10^{-4}$ mole) of titanium trichloride in 3-pentenenitrile followed by 11.388 g. of 3-pentenenitrile, 14.6 ml. of $CH_3OCH_2CH_2OCH_3$, 0.902 g. of

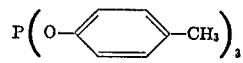

and 0.440 g. of

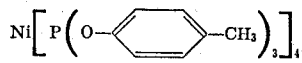

A stream of nitrogen gas is bubbled through liquid hydrogen cyanide contained in a 20 ml. flask cooled in an ice bath. The nitrogen gas flow is adjusted to 3.5 ml. of nitrogen per minute to give a total hydrogen cyanide feed of 1.1 ml. (as measured at 0° C.) of liquid hdyrogen cyanide. The resulting gas mixture is swept across the surface of the reaction mixture in the flask. After 12 hours and 5 minutes, the reaction is shut down.

Gas chromatographic analysis indicates that 12.4 percent of the 3-pentenenitrile is converted to dinitriles and that of the 3-pentenenitrile so converted, 90.8 percent is adiponitrile, 7.8 percent is 2-methylglutaronitrile and 1.4 percent is ethylsuccinonitrile. The number of cycles (moles ratio of dicyanobutanes produced to catalyst charged) is 62.3.

Example XXVII

A 50 ml., three-necked, round bottom flask fitted with a reflux condenser connected to a Dry Ice trap, an inlet, a thermometer, and a magnetic stirrer, is set up in an oil bath maintained at 65±3° C., and purged with nitrogen. The flask is charged with 0.29 g. ($9 \times 10^{-4}$ mole) of hafnium tetrachloride followed by 29.2 ml. (0.298 mole) of 3-pentenenitrile, 1.62 ml. ($6 \times 10^{-3}$ mole) of

and 0.880 g. ($6 \times 10^{-4}$ mole) of

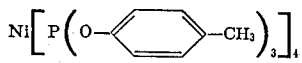

A stream of nitrogen gas is bubbled through liquid hydrogen cyanide contained in a 20 ml. flask cooled in an ice bath. The nitrogen gas flow is adjusted to 7 ml. of nitrogen per minute to give a total hydrogen cyanide feed of 8.4 ml. (as measured at 0° C.) of liquid hydrogen cyanide. The resulting gas mixture is swept across the surface of the reaction mixture in the flask. After 22 hours, the reaction is shut down.

Gas chromatographic analysis indicates that 4.9 percent of the 3-pentenenitrile is converted to dinitriles and that of the 3-pentenenitrile so converted, 81.6 percent is adiponitrile, 15.7 percent is 2-methylglutaronitrile and 2.7 percent is ethylsuccinonitrile. The number of cycles (mole ratio of dicyanobutanes produced to catalyst charged) is 23.8. There is an apparent conversion to other nitriles as based on the nitriles analyzed of 0.9 percent.

Example XXVIII

A 50 ml., three-necked, round bottom flask fitted with a reflux condenser connected to a Dry Ice trap, an inlet, a thermometer, and a magnetic stirrer, is set up in an oil bath maintained at about 45° C., and purged with nitrogen. The flask is charged with 0.105 g. ($4.5 \times 10^{-4}$ mole) of zirconium tetrachloride followed by 29.2 ml. (0.298 mole) of 3-pentenenitrile, 0.81 ml. of

and 0.440 g. ($3 \times 10^{-4}$ mole) of

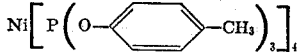

A stream of nitrogen gas is bubbled through liquid hydrogen cyanide contained in a 20 ml. flask cooled in an ice bath. The nitrogen gas flow is adjusted to about 4 ml. of nitrogen per minute to give a total hydrogen cyanide feed of 1 ml. (as measured at 0° C.) of liquid hydrogen cyanide. The resulting gas mixture is swept across the surface of the reaction mixture in the flask. After 4 hours and 57 minutes, the reaction is shut down.

Gas chromatographic analysis indicates that of the 3-pentenenitrile converted to dinitriles, 81.5 percent is adiponitrile, 17.3 percent is 2-methylglutaronitrile and 1.2 percent is ethylsuccinonitrile. The number of cycles (mole ratio of dicyanobutanes produced to catalyst charged) is 26.5. The apparent loss of 3-pentenenitrile to 2-pentenenitriles, as based on 3-pentenenitrile charged is less than 0.2 percent.

Example XXIX

A 50 ml., three-necked, round bottom flask fitted with a reflux condenser connected to a Dry Ice trap, a gas inlet and a magnetic stirrer, is set up in an oil bath maintained at 120–132° C., and purged with dry deoxygenated nitrogen. The flask is charged with 0..312 g. ($1.64 \times 10^{-3}$ mole) of $SnCl_2$, 4.06 g. ($1.31 \times 10^{-2}$ mole) of $P(OC_6H_5)_3$, and 20.3 g. (0.25 mole) of 3-pentenenitrile followed by 2.29 g. ($1.64 \times 10^{-3}$ mole) of $Ni[P(OC_6H_5)_3]_4$. A stream of dry, deoxygenated nitrogen gas is bubbled through 3.2 ml. of hydrogen cyanide contained in a 20 ml. flask cooled in an ice bath. The hydrogen cyanide is replenished as needed. The nitrogen gas flow is adjusted to 35 ml. of nitrogen gas per minute. After 18 hours and 45 minutes, the reaction is shut down. The total amount of hydrogen cyanide fed to the reaction is 8.5 ml.

Gas chromatographic analysis indicates that 22 percent of the reaction medium at shut down is adiponitrile and that of the 3-pentenenitrile converted to dinitriles, 80 percent is adiponitrile. The number of cycles (molar ratio of dicyanobutanes produced to catalyst charged) is 45.

Example XXX

A 50 ml., three-necked, round bottom flask fitted with a reflux condenser connected to a Dry Ice trap, an inlet, and a magnetic stirrer, is set up in an oil bath maintained at 80–83° C., and purged with dry, deoxygenated nitrogen. The flask is charged with 0.071 g. ($4.5 \times 10^{-4}$ mole) of $SnF_2$, 29.2 ml. (0.3 mole) of 3-pentenenitrile, 0.785 ml. ($3 \times 10^{-3}$ mole) of $P(OC_6H_5)_3$, followed by 0.420 g. ($3 \times 10^{-4}$ mole) of $Ni[P(OC_6H_5)_3]_4$. A stream of dry, deoxygenated nitrogen gas is bubbled through 6.6 ml. of liquid hydrogen cyanide contained in a 20 ml. flask cooled in an ice bath. The nitrogen gas flow is adjusted to 4 ml. of nitrogen gas per minute. After 4 hours and 48 minutes, the reaction is shut down. The total amount of hydrogen cyanide fed to the reaction is 1.6 ml.

Gas chromatographic analysis indicates that 6 percent of the 3-pentenenitrile is converted to dinitriles and that of the dinitriles produced, 69.3 percent is adiponitrile, 22 percent is 2-methylglutaronitrile and 8.5 percent is ethylsuccinonitrile. The number of cycles is 59.

Example XXXI

A 50 ml., three-necked, glass flask is fitted with a gas inlet tube positioned for a gas sweep over the surface of the flask's contents, a thermometer, and a gas outlet through a water cooled condenser. The flask is heated with an oil bath. Before charging the reagents, the entire system is purged well with purified nitrogen. Hydrogen cyanide is purified by bubbling purified nitrogen through the liquid until the volume is reduced by one-half and then distilling the remainder. The reaction flask is charged with 25 ml. of 3-pentenenitrile, 0.032 g. of $VCl_3$, 0.7 ml. of tri-p-cresylphosphite, and 0.4 g. of tetrakis(tri-p-cresylphosphite) nickel (O). The flask is placed in an oil bath to maintain a temperature of 57–64° C., and hydrogen cyanide gas is swept across the surface of the catalyst mixture in a nitrogen carrier gas. Nitrogen flow rate is adjusted so that about 0.2 ml. of liquid hydrogen cyanide is added per hour. After 6.5 hours of operation, the reaction is stopped and the crude liquid analyzed by gas chromatography. Analyses show that the sample contains 1.21 percent adiponitrile, 0.22 percent 2-methylglutaronitrile, and 0.2 percent ethylsuccinonitrile.

Example XXXII

As described in Example XXXI, 25 ml. of 3-pentenenitrile, 0.033 g. of $FeCl_3$, 0.88 g. of tri-p-cresylphosphite, and 0.4 g. of tetrakis (tri-p-cresylphosphite) nickel (O) are charged to the reaction flask. The flask is placed in an oil bath to maintain a temperature of 58–62° C., and hydrogen cyanide gas is swept across the surface of the catalyst mixture in a nitrogen carrier gas. Nitrogen flow rate is adjusted so that about 0.2 ml. of liquid hydrogen cyanide is added per hour. After 5 hours of operation, the reaction is stopped. After standing at 25° C. under nitrogen for 2 days, the mixture is heated to 57–60° C., and hydrogen cyanide addition resumed. A total of 0.2 ml. of liquid hydrogen cyanide is added over a one-hour period. The addition is then stopped and the crude liquid analyzed by gas chromatography. Analyses show that the sample contains 10.29 percent adiponitrile, 2.87 percent 2-methylglutaronitrile, and 0.55 percent ethylsuccinonitrile.

Example XXXIII

As described in Example XXXI, 25 ml. of 3-pentenenitrile, 0.034 g. of iron (II) chloride, 0.88 g. of tri-p-cresylphosphite, and 0.4 g. of tetrakis(tri-p-cresylphosphite) nickel (O) are charged to the reaction flask. The flask is placed in an oil bath to maintain a temperature of 57–59° C. and hydrogen cyanide gas is swept across the surface of the catalyst mixture in a nitrogen carrier gas. Nitrogen flow rate is adjusted so that about 0.2 ml. of liquid hydrogen cyanide is added per hour. After 4 hours of operation, the reaction is stopped. After standing at 25° C. under nitrogen for 17 hours, the mixture is heated to 58–59° C., and hydrogen cyanide addition is resumed. A total of 0.1 ml. of liquid hydrogen cyanide is added over a one-hour period. The addition is then stopped and the crude liquid analyzed by gas chromatography. Analyses show that the sample contains 6.81 percent adiponitrile, 1.61 percent 2-methylglutaronitrile, and 0.25 percent ethylsuccinonitrile.

Example XXXIV

As described in Example XXXI, 25 ml. of 3-pentenenitrile, 0.034 g. of $MnCl_2$, 0.88 g. of tri-p-cresylphosphite, and 0.4 g. of tetrakis(tri-p-cresylphosphite)nickel (O) are charged to the reaction flask. The flask is placed in an oil bath to maintain a temperature of 57–61° C., and hydrogen cyanide gas is swept across the surface of the catalyst mixture in a nitrogen carrier gas. Nitrogen flow rate is adjusted so that about 0.2 ml. of liquid hydrogen cyanide is added per hour. After 4.5 hours of operation, the reaction is stopped and the crude liquid product is analyzed by gas chromatography. Analyses show that the sample contains 2.01 percent adiponitrile, 0.53 percent 2-methylglutaronitrile, and 0.25 percent ethylsuccinonitrile.

Example XXXV

As described in Example XXXI, 20.66 g. of 3-pentenenitrile, 0.035 g. of cobalt (II) chloride, 0.7 ml. of tri-p-cresylphosphite, and 0.4 g. of tetrakis(tri-p-cresylphosphite) nickel (O) are charged to the reaction flask. The flask is placed in an oil bath to maintain a temperature of 59–60° C., and hydrogen cyanide gas is swept across the surface of the catalyst mixture in a nitrogen carrier gas. Nitrogen flow rate is adjusted so that about 0.2 ml. of liquid hydrogen cyanide is added per hour. After 5 hours of operation, the reaction is stopped and the crude liquid product is analyzed by gas chromatography. Analyses show that the sample contains 12.47 percent adiponitrile, 2.90 percent 2-methylglutaronitrile, 0.61 percent ethylsuccinonitrile.

Example XXXVI

As described in Example XXXI, 25 ml. of 3-pentenenitrile, 0.041 g. of scandium (III) chloride, 0.7 ml. of tri-p-cresylphosphite, and 0.4 g. of tetrakis(tri-p-cresylphosphite) nickel (O) are added to the reaction flask. The flask is placed in an oil bath to maintain a temperature of 59° C., and hydrogen cyanide gas is swept across the surface of the catalyst mixture in a nitrogen carrier gas. Nitrogen flow rate is adjusted so that about 0.2 ml. of liquid hydrogen cyanide is added per hour. After 3.5 hours of operation, the reaction is stopped and the crude liquid is analyzed by gas chromatography. Analyses show that the sample contains 1.30 percent adiponitrile, 0.23 percent 2-methylglutaronitrile, and 0.22 percent ethylsuccinonitrile.

Example XXXVII

As described in Example XXXI, 25 ml. of 3-pentenenitrile, 0.048 g. of palladium (II) chloride, 0.7 ml. of tri-p-cresylphosphite, and 0.4 g. of tetrakis(tri-p-cresylphosphite) nickel (O) are charged to the reaction flask. The flask is placed in an oil bath to maintain a temperature of 58–60° C., and hydrogen cyanide gas is swept across the surface of the catalyst mixture in a nitrogen carrier gas. Nitrogen flow rate is adjusted so that about 0.2 ml. of liquid hydrogen cyanide is added per hour. After 3.5 hours of operation, the reaction is stopped and the crude liquid is analyzed by gas chromatography. Analyses show that the sample contains 0.30 percent adiponitrile, 0.04 percent 2-methylglutaronitrile, and 0.12 percent ethylsuccinonitrile.

Example XXXVIII

As described in Example XXXI, 25 ml. of 3-pentenenitrile, 0.055 g. of bis-acetonitrile dichlorochromium (II), 0.7 ml. of tri-p-cresylphosphite, and 0.4 g. of tetrakis(tri-p-cresylphosphite) nickel (O) are charged to the reaction flask. The flask is placed in an oil bath to maintain a temperature of 56–65° C., and hydrogen cyanide gas is swept across the surface of the catalyst mixture in a nitrogen carrier gas. Nitrogen flow rate is adjusted so that about 0.2 ml. of liquid hydrogen cyanide is added per hour. After 3 hours of operation, the reaction is stopped and the crude liquid is analyzed by gas chromatography. Analyses show that the sample contains 12.17 percent adiponitrile, 2.67 percent 2-methylglutaronitrile and 0.48 percent ethylsuccinonitrile.

Example XXXIX

As described in Example XXXI, 25 ml. of 3-pentenenitrile, 0.10 g. of thorium (IV) chloride, 0.7 ml. of tri-p-cresylphosphite, and 0.4 g. of tetrakis(tri-p-cresylphosphite) nickel (O) are charged to the reaction flask. The flask is placed in an oil bath to maintain a temperature of 59–60° C., and hydrogen cyanide gas is swept across the surface of the catalyst mixture in a nitrogen carrier gas. Nitrogen flow rate is adjusted so that about 0.2 ml. of liquid hydrogen cyanide is added per hour. After 3 hours and 40 minutes of operation, the reaction is stopped and the crude liquid is analyzed by gas chromatography. Analyses show that the sample contains 0.77 percent adiponitrile, 0.01 percent 2-methylglutaronitrile, and 0.01 percent ethylsuccinonitrile.

Example XXXX

As described in Example XXXI, 25 ml. of 3-pentenenitrile, 0.079 g. of rhenium (III) chloride, 0.7 ml. of tri-p-cresylphosphite, and 0.4 g. of tetrakis(tri-p-cresylphosphite) nickel (O) are charged to the reaction flask. The flask is placed in an oil bath to maintain a temperature of 55–65° C., and hydrogen cyanide gas is swept across the surface of the catalyst mixture in a nitrogen carrier gas. Nitrogen flow rate is adjusted so that about 0.2 ml. of liquid hydrogen cyanide is added per hour. After 4 hours of operation, the reaction is stopped and the crude liquid is analyzed by gas chromatography. Analyses show that the sample contains 0.82 percent adiponitrile, 0.19 percent 2-methylglutaronitrile, and 0.11 percent ethylsuccinonitrile.

Example XXXXI

As described in Example XXXI, 15.1 g. of 3-pentenenitrile, 5.0 g. of tetrahydrofuran, 0.4 g. of tris(tetrahydrofuran) trichlorochromium (III), 1.4 ml. of tri-p-cresylphosphite, and 0.8 g. of tetrakis(tri-p-cresylphosphite) nickel (O) are charged to the reaction flask. The flask is placed in an oil bath to maintain a temperature of 41–43° C., and hydrogen cyanide gas is swept across the surface of the catalyst mixture in a nitrogen carrier gas. Nitrogen flow rate is adjusted so that about 0.2 ml. of liquid hydrogen cyanide is added per hour. After 46 hours of operation, the reaction is stopped and the crude liquid is analyzed by gas chromatography. Analyses show that the sample contains 60.81 percent adiponitrile, 5.51 percent 2-methylglutaronitrile, and 1.40 percent ethylsuccinonitrile.

Example XXXXII

Reaction equipment is composed of a 50 ml., 3-necked, glass flask fitted with a gas inlet tube adjusted for gas flow across the surface of the reactants, a vent through a water cooled condenser, and a thermometer. Liquid reactant mixtures are stirred with a Teflon® coated, magnetic stirring bar. For operation, nitrogen gas is bubbled through liquid hydrogen cyanide maintained at 0° C. and the resulting gas mixture is swept across the surface or the olefin-catalyst mixture. Hydrogen cyanide feed rate is controlled by adjusting nitrogen flow. Under nitrogen, the reaction flask is charged with 0.5 g. of nickelocene, 15 ml. of triphenylphosphite, 20.3 g. of 3-pentenenitirile, and 0.4 g. of zinc (II) chloride. The reaction mixture is heated to 115–117° C., and hydrogen cyanide gas is swept across the reaction mixture in nitrogen carrier gas. Nitrogen flow rate is adjusted so that about 0.2 ml. of liquid hydrogen cyanide is added per hour. After about 23 hours of operation, the liquid product is analyzed by gas chromatography. Analyses show that the crude sample contains 18.63 percent adiponitrile, 5.47 percent 2-methylglutaronitrile, and 0.5 percent ethylsuccinonitrile.

Example XXXXIII

As described in Example XXXXII, 20.4 g. of 3-pentenenitrile, 0.5 g. of nickelocene, 15 ml. of triphenylphosphite, and 0.4 g. of zinc (II) chloride are charged to the reaction flask. The reaction mixture is heated to 115–117° C., and hydrogen cyanide gas is swept across the reaction mixture in nitrogen carrier gas. Nitrogen flow rate is adjusted so that about 0.2 ml. of liquid hydrogen cyanide is added per hour. After about 20 hours of operation, the liquid product is analyzed by gas chromatography. Analyses show that the sample contains 14.57 percent adiponitrile, 5.13 percent 2-methylglutaronitrile and 0.27 percent ethylsuccinonitrile.

Example XXXXIV

As described in Example XXXXII, 0.5 g. of nickelocene, 30 ml. of triphenylphosphite, 20.4 g. of 3-pentenenitrile, and 0.4 g. of zinc (II) chloride are charged to a 100 ml. reaction flask. The reaction mixture is heated to 75–79° C., and hydrogen cyanide gas is swept across the reaction mixture in nitrogen carrier gas. Nitrogen flow rate is adjusted so that about 0.2 ml. of liquid hydrogen cyanide is added per hour. After about 20.5 hours of operation, the liquid product is analyzed by gas chromatography. Analyses show that the crude liquid sample contains 11.98 percent adiponitrile, 2.09 percent 2-methylglutaronitrile, and 0.27 percent ethylsuccinonitrile.

Example XXXXV

As described in Example XXXXII, 20.5 g. of 3-pentenenitrile, 0.4 g. of zinc (II) chloride, 15 ml. of triphenyl phosphite and 0.29 g. of $[C_5H_5NiCO]_2$ are charged to the reaction flask. The reaction mixture is heated to 113–115° C., and hydrogen cyanide gas is swept across the reaction mixture in nitrogen carrier gas. Nitrogen flow is adjusted so that about 0.2 ml. of liquid hydrogen cyanide is added per hour. After about 20 hours of operation, the liquid product is analyzed by gas chromatography. Analyses show that the crude sample contains 14.73 percent adiponitrile, 3.95 percent 2-methylglutaronitrile, and 0.57 percent ethylsuccinonitrile.

Example XXXXVI

As described in Example XXXXII, 0.5 g. of

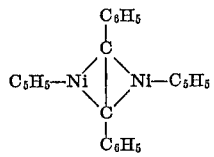

15 ml. of triphenylphosphite, 20.5 g. of 3-pentenenitrile, and 0.4 g. of zinc (II) chloride are charged to the reaction flask. The reaction mixture is heated to 116–117° C., and hydrogen cyanide gas is swept across the reaction mixture in nitrogen carrier gas. Nitrogen flow rate is adjusted so that about 0.2 ml. of liquid hydrogen cyanide is added per hour. After about 21 hours of operation, the liquid product is analyzed by gas chromatography. Analyses show that the sample contains 21.23 percent adiponitrile, 4.43 percent 2-methylglutaronitrile, and 0.59 percent ethylsuccinonitrile.

Example XXXXVII

As described in Example XXXXII, 15 ml. of triphenylphosphite, 0.5 g. of

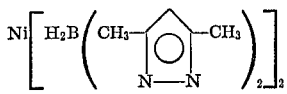

and 0.2 g. of zinc (II) chloride are charged to the reaction equipment. The mixture is heated to 113° C. over a period of 18 minutes and 20 g. of 3-pentenenitrile is added. The reaction mixture is heated to 119–120° C., and hydrogen cyanide gas is swept across the reaction mixture in nitrogen carrier gas. Nitrogen flow rate is adjusted so that about 0.2 ml. of liquid hydrogen cyanide is added per hour. After about 8 hours of operation, the liquid product is analyzed by gas chromatography. Analyses show that the crude liquid sample contains 2.98 percent adiponitrile, 0.79 percent 2-methylglutaronitrile, and 0.14 percent ethylsuccinonitrile.

Example XXXXVIII

As described in Example XXXXII, 0.5 g. of pi-$C_3H_5Ni,P\emptyset_3$)(Cl)

15 ml. of triphenylphosphite, and 0.2 g. of zinc (II) chloride are charged to the reaction flask. The mixture is heated to 105° C. over a period of 20 minutes, and 20 g. of 3-pentenenitrile is added. The mixture is heated to 119° C. and hydrogen cyanide gas is swept across the reaction mixture in nitrogen carrier gas. Nitrogen flow rate is adjusted so that about 0.2 ml. of liquid hydrogen cyanide is added per hour. After about 5 hours of operation, the liquid product is analyzed by gas chromatography. Analyses show that the crude sample contains 4.65 percent adiponitrile, 0.90 percent 2-methylglutaronitrile, and 0.57 percent ethylsuccinonitrile.

Example XXXXIX

As described in Example XXXXII, 0.5 g. of

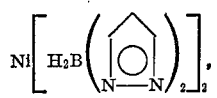

15 ml. of triphenylphosphite, and 0.2 g. of zinc (II) chloride are charged to the reaction flask. The mixture is heated to 116° C. over a period of 30 minutes, and 20 g. of 3-pentenenitrile is added. The mixture is heated at 117° C. and hydrogen cyanide gas is swept across the reaction mixture in nitrogen carrier gas. Nitrogen flow rate is adjusted so that about 0.2 ml. of liquid hydrogen cyanide is added per hour. After about 2.25 hours of operation, the liquid product is analyzed by gas chromatography. Analyses show that the crude sample contains 1.77 percent adiponitrile, 0.27 percent 2-methylglutaronitrile, and 0.06 percent ethylsuccinonitrile.

Example L

As described in Example XXXXII, 0.3 g. of

Ni[$CH_2$=CHCN]$_2$ 20 g. of 3-pentenenitrile, 15 ml. of triphenylphosphite, and 0.4 g. of zinc (II) chloride are charged to the reaction flask. The reaction mixture is heated at 112–120° C., and hydrogen cyanide gas is swept across the reaction mixture in nitrogen carrier gas. Nitrogen flow rate is adjusted so that about 0.2 ml. of liquid hydrogen cyanide is added per hour. After about 5 hours of operation, the liquid product is analyzed by gas chromatography. Analyses show that the crude liquid sample contains 4.27 percent adiponitrile, 3.55 percent 2-methylglutaronitrile, and 0.18 percent ethylsuccinonitrile.

Example LI

As described in Example XXXXII, 15 ml. of triphenylphosphite, 0.46 ml. of nickel tetracarbonyl, 0.5 g. of zinc (II) chloride, and 20 g. of 3-pentenenitrile are charged to the reaction flask. After gas evolution stopped, the reaction mixture is heated at 115–120° C., and hydrogen cyanide gas is swept across the reaction mixture in nitrogen carrier gas. Nitrogen flow rate is adjusted so that about 0.2 ml. of liquid hydrogen cyanide is added per hour. After about 2.5 hours of operation, the liquid product is analyzed by gas chromatography. Analyses show that the crude sample contains 3.0 percent adiponitrile, 0.51 percent 2-methylglutaronitrile and 0.17 percent ethylsuccinonitrile.

Example LII

As described in Example XXXXII, 0.95 g. of nickel acetylacetonate, 15 ml. of triphenylphosphite, 20 g. of 3-pentenenitrile, 0.5 g. of zinc (II) chloride, and 3.7 ml. of Al($CH_2CH_3$)$_3$ solution (1 molar in cyclohexane) are added to the reaction flask. Temperature rises from 28–51° C. on addition of the triethylaluminum. The reaction mixture is heated at 77–79° C., and hydrogen cyanide gas is swept across the reaction mixture in nitrogen carrier gas. Nitrogen flow rate is adjusted so that about 0.2 ml. of liquid hydrogen cyanide is added per hour. After about 4 hours of operation, the liquid product is analyzed by gas chromatography. Analyses show that the sample contains 5.48 percent adiponitrile, 0.9 percent 2-methylglutaronitrile, and 0.01 percent ethylsuccinonitrile.

Example LIII

As described in Example XXXXII, 0.4 g. of zinc (II) chloride, 20 g. of 3-pentenenitrile, 15 ml. of triphenylphosphite, and 0.4 g. of $C_5H_5$NiNO are charged to the reaction flask. The reaction mixture is heated at 119–121° C., and hydrogen cyanide gas is swept across the reaction mixture in nitrogen carrier gas. Nitrogen flow rate is adjusted so that about 0.2 ml. of liquid hydrogen cyanide is added per hour. After about 5 hours of operation, the liquid product is analyzed by gas chromatography. Analyses show that the crude sample contains 0.98 percent adiponitrile, 0.09 percent 2-methylglutaronitrile and 0.09 percent ethylsuccinonitrile.

Example LIV

As described in Example XXXXII, 0.4 g. of ZnCl$_2$, 20 g. of 3-pentenenitrile, 15 ml. of triphenylphosphite, and 0.6 g. of [$C_5H_5NiSC_6H_5$]$_2$ are charged to the reaction flask. The reaction mixture is heated to 117–120° C., and hydrogen cyanide gas is swept across the reaction mixture in nitrogen carrier gas. Nitrogen flow rate is adjusted so that about 0.2 ml. of liquid hydrogen cyanide is added per hour. After about 5 hours of operation, the liquid product is analyzed by gas chromatography. Analyses show that the crude sample contains 2.65 percent adiponitrile, 0.57 percent 2-methylglutaronitrile, and 0.11 percent ethylsuccinonitrile.

Example LV

As described in Example XXXXII, 20.7 g. of 3-pentenenitrile, 2.2 g. of $Ni(P\varnothing_3)_2(CO)_2$, 0.15 g. of zinc (II) chloride, and 11 g. of tri-p-cresylphosphite are charged to the reaction flask. The reaction mixture is heated at 115–118° C., and hydrogen cyanide gas is swept across the reaction mixture in nitrogen carrier gas. Nitrogen flow rate is adjusted so that about 0.2 ml. per hour of liquid hydrogen cyanide is fed for the first 3 hours. Hydrogen cyanide feed rate is then increased to 0.3 ml. per hour for the remaining period of operation. After a total operating time of about 21 hours, the liquid product is analyzed by gas chromatography. Analyses show that the crude sample contains 13.88 percent adiponitrile, 3.82 percent 2-methylglutaronitrile, and 0.46 percent ethylsuccinonitrile.

Example LVI

As described in Example XXXXII, 21.0 g. of 3-pentenenitrile, 2.2 g. of $Ni(P\varnothing_3)_2(CO)_2$, 1.3 g. of triphenylboron, and 11.0 g. of tri-p-cresylphosphite are charged to the reaction flask. The reaction mixture is heated at 120° C. and hydrogen cyanide gas is swept across the reaction mixture in nitrogen carrier gas. Nitrogen flow rate is adjusted so that about 0.2 ml. of liquid hydrogen cyanide is added per hour. After about 4 hours of operation, the liquid product is analyzed by gas chromatography. Analyses show that the sample contains 3.87 percent adiponitrile, 0.25 percent 2-methylglutaronitrile, and 0.01 percent ethylsuccinonitrile.

Example LVII

As described in Example XXXXII, 20.7 g. of 3-pentenenitrile, 0.46 ml. of nickel tetracarbonyl, 11 ml. of tri-p-cresylphosphite, and 0.5 g. of $ZnCl_2$ are charged to the reaction flask. The reaction mixture is heated at 129–133° C., and hydrogen cyanide gas is swept across the reaction mixture in nitrogen carrier gas. Nitrogen flow rate is adjusted so that about 0.2 ml. of liquid hydrogen cyanide is added per hour. After about 21 hours of operation, the liquid product is analyzed by gas chromatography. Analyses show that the sample contains 31.84 percent adiponitrile, 7.67 percent 2-methylglutaronitrile, and 1.11 percent ethylsuccinonitrile.

Example LVIII

As described in Example XXXXII, 1.26 g. of $C_5H_5NiBr(P\varnothing_3)$, 0.4 g. of $ZnCl_2$, and 15 ml. of triphenylphosphite are charged to the reaction flask. The mixture is heated to 96° C. and 20.0 g. of 3-pentenenitrile is added. The mixture is then heated at 119–120° C. and hydrogen cyanide gas is swept across the reaction mixture in nitrogen carrier gas. Nitrogen flow rate is adjusted so that about 0.2 ml. of liquid hydrogen cyanide is added per hour. After about 3 hours of operation, the liquid product is analyzed by gas chromatography. Analyses show that the crude sample contains 3.38 percent adiponitrile, 0.5 percent 2-methylglutaronitrile, and 0.1 percent ethylsuccinonitrile.

Examples LIX–LXIV

Examples LIX–LXIV illustrate the effect of excess tri-p-cresylphosphite on the efficiency of tetrakis (tri-p-cresylphosphite) nickel (O) catalyst using a representative group of Lewis acid activators.

As described in Example XXXXII, 0.4 g. of tetrakis (tri-p-cresylphosphite) nickel (O), 20 g. of 3-pentenenitrile, and excess tri-p-cresylphosphite and activator as shown in the accompanying table are charged to the reaction flask. The reaction mixtures are heated at 57–61° C., and hydrogen cyanide gas is swept across the reaction mixture in nitrogen carrier gas. Nitrogen flow rates are adjusted so that about 0.2 ml. of liquid hydrogen cyanide is added per hour. After about 20 hours of operation, the liquid products are analyzed by gas chromatography. The following table summarizes the results for each activator-phosphite charge.

| Example | Activator Compound | Weight gram | Cresyl-phosphite, weight grams | Dinitrile distribution ADN | MGN | ESN | Catalyst cycles |
|---|---|---|---|---|---|---|---|
| LIX | $MnCl_2$ | 0.034 | 0.00 | 70 | 25.5 | 4.4 | 168 |
| LX | $MnCl_2$ | 0.034 | 0.83 | 80 | 16.9 | 2.9 | 281 |
| LXI | $SnCl_2$ | 0.051 | 0.00 | 71.7 | 23.4 | 4.9 | 101 |
| LXII | $SnCl_2$ | 0.051 | 0.83 | 71.7 | 21.8 | 6.4 | 303 |
| LXIII | $AlCl_3$ | 0.036 | 0.00 | 39.1 | 46.2 | 14.6 | 131 |
| LXIV | $AlCl_3$ | 0.036 | 0.83 | 39.7 | 41.6 | 18.5 | 317 |

Example LXV

A 50 ml., three-necked, round bottom flask fitted with a reflux condenser connected to a Dry Ice trap, an inlet, and a magnetic stirrer is set up in an oil bath and purged with dry deoxygenated nitrogen. The flask is charged with 0.097 g. ($4.5 \times 10^{-4}$ mole) of $NbOCl_3$, 29.2 ml. (0.3 mole) of 3-pentenenitrile, 0.785 ml. ($3 \times 10^{-3}$ mole) of $P(OC_6H_5)_3$, and 0.420 g. ($3 \times 10^{-4}$ mole) of $Ni[P(OC_6H_5)_3]_4$. The contents of the flask are maintained at 78–83° C. during the reaction. A stream of dry, deoxygenated nitrogen is bubbled through liquid hydrogen cyanide contained in a 20 ml. flask cooled in a water bath at ambient temperature. The resulting gas mixture is swept across the surface of the reaction mixture. After 1 hour and 23 minutes the reaction is shut down.

Gas chromatographic analysis indicates that the crude reaction mixture contains 1.2 percent adiponitrile.

Example LXVI

A 50 ml., three-necked, round bottom flask fitted with a reflux condenser connected to a Dry Ice trap, an inlet, and a magnetic stirrer is set up in an oil bath maintained at 80° C. and purged with dry deoxygenated nitrogen. The flask is charged with 0.65 g. ($5 \times 10^{-4}$ mole) of $$Ni[P(OC_2H_5)_3]_4,$$

0.2 g. $MoCl_2$, 20 g. (0.248 mole) of 3-pentenenitrile, and 3.0 g. (0.01 mole) of $P(OC_6H_5)_3$. A stream of dry deoxygenated nitrogen gas is bubbled at a rate of 15 ml. per minute through liquid hydrogen cyanide contained in a 20 ml. flask cooled in an ice bath. The resulting gas mixture is swept across the surface of the reaction mixture in the flask. The reaction is run until the catalyst appears to be dead. At this point gas chromatographic analysis indicates that the reaction mixture contains 3.26 percent of adiponitrile, 0.79 percent of 2-methylglutaronitrile and 0.36 percent of ethylsuccinonitrile. The number of cycles is 19.

Example LXVII

A 50 ml., three-necked, round bottom flask fitted with a reflux condenser connected to a Dry Ice trap, an inlet, and a magnetic stirrer is set up in an oil bath maintained at 75–77° C. and purged with dry deoxygenated nitrogen. The flask is charged with two small spatulas full (about 0.1–0.2 g.) of $BeCl_2$, 39.1 ml. (0.4 mole) of 3-pentenenitrile, 3.4 ml. ($1.1 \times 10^{-2}$ mole) of $P(OC_6H_5)_3$, followed by 1.40 ml. (1.1×10⁻³ mole) Ni[P(OC₆H₅)₃]₄. (The BeCl₂ was approximately rather than weighed out due to its extreme toxicity. The working surface of the spatula used measured about 1 mm. wide by 5 mm. long.) A stream of dry deoxygenated nitrogen gas is bubbled through 10.5 ml. of hydrogen cyanide contained in a 20 ml. flask cooled in an ice bath. The resulting gas mixture is swept across the surface of the reaction mixture in the flask. After 50 minutes, the flask contained approximately 3 percent adiponitrile which corresponds to a 79 percent yield of adiponitrile and 15 cycles. The total amount of hydrogen cyanide fed to the reaction medium is 1.5 ml.

Example LXVIII

A 50 ml., three-necked, round bottom flask fitted with a reflux condenser connected to a dry ice trap, an inlet, and a magnetic stirrer is set up in an oil bath maintained at 82–86° C. and purged with dry deoxygenated nitrogen. The flask is charged with 0.170 g. (4.5×10⁻⁴ mole) of ErCl₃·6H₂O, 29.2 ml. (0.3 mole) of 3-pentenenitrile, 0.78 ml. (3×10⁻³ mole) of P(OC₆H₅)₃ followed by 0.420 g. (3×10⁻⁴ mole) of Ni[P(OC₆H₅)₃]₄. A stream of dry, deoxygenated nitrogen gas is bubbled through 8.4 ml. of hydrogen cyanide contained in a 20 ml. flask cooled in an ice bath. The resulting gas mixture is swept across the surface of the reaction mixture in the flask. After 2 hours and 43 minutes the reaction is shut down. The total amount of hydrogen cyanide fed to the reaction medium is 1.8 ml.

Gas chromatographic analysis indicates that of the dinitriles produced 77 percent are adiponitrile. The number of cycles is 5–7.

Example LXIX

A 50 ml., three-necked, round botom flask fitted with a reflux condenser connected to a Dry Ice trap, an inlet and a magnetic stirrer is set up in an oil bath maintained at 80° C. and purged with dry, deoxygenated nitrogen. The flask is charged with 0.10 g. (.00051 mole) of AgBF₄ followed by 1.0 g. (.000768 mole) of Ni[P(OC₆H₅)₃]₄, 20 g. (0.247 mole) of 3-pentenenitrile and 1.91 g. (0.00616 mole) of P(OC₆H₅)₃. A stream of dry deoxygenated nitrogen gas is bubbled through 10 ml. of liquid hydrogen cyanide contained in a 20 ml. receiver cooled in an ice bath. The nitrogen gas flow is adjusted to 15 ml. of nitrogen per minute. The resulting gas mixture is passed through a bed of phosphorus pentoxide to eliminate traces of moisture and then is swept across the surface of the reaction mixture in the flask. After 2 hours and 18 minutes, the reaction is shut down. Gas chromatographic analysis shows that the reaction mixture contains 4.82 percent adiponitrile, 1.54 percent 2-methylglutaronitrile, and 0.24 percent ethylsuccinonitrile. The number of cycles is 18.8.

Example LXX

As described in Example XXIII, 25 ml. of 3-pentenenitrile, 0.4 g. of tetrakis (tri-p-cresylphosphite) nickel (O), 0.078 g. of germanium (IV) iodide, and 0.7 ml. of tri-p-cresylphosphite are charged to the reaction flask. The flask is placed in an oil bath to maintain a temperature of 59–61° C., and hydrogen cyanide gas is swept across the surface of the catalyst mixture in a nitrogen carrier gas. Nitrogen flow rate is adjusted so that about 0.2 ml. of liquid hydrogen cyanide is added per hour. After about 3.5 hours of operation, the reaction is stopped and the crude liquid is analyzed by gas chromatography. Analyses show that the sample contains 0.44 percent adiponitrile, 0.04 percent 2-methylglutaronitrile, and a trace of ethylsuccinonitrile.

Example LXXI

As described in Example XXIII, 25 ml. of 3-pentenenitrile, 0.4 g. of tetrakis (tri-p-cresylphosphite) nickel (O), 0.05 g. of tungsten (V) chloride, and 0.7 ml. of tri-p-cresylphosphite are charged to the reaction flask. The flask is placed in an oil bath to maintain a temperature of 57–59° C., and hydrogen cyanide gas is swept across the surface of the catalyst mixture in a nitrogen carrier gas. Nitrogen flow rate is adjusted so that about 0.2 ml. of liquid hydrogen cyanide is added per hour. After about 5 hours of operation, the reaction is stopped and the crude liquid is analyzed by gas chromatography. Analyses show that the sample contains 1.22 percent adiponitrile, 0.29 percent 2-methylglutaronitrile, and 0.14 percent ethylsuccinonitrile.

Example LXXII

A 2-liter agitated autoclave is charged with 350 ml. (liquid measure) of hydrogen cyanide and 800 ml. (liquid measure) of butadiene. This mixture is heated to 103° C. and thereafter maintained at 102.5–109.0° C. and the reaction started by injecting a mixture of catalyst, toluene and mesitylene. The calculated initial charge is:

| Material | Grams | Gram-moles/kg. |
|---|---|---|
| Hydrogen cyanide | 245.0 | 9.314 |
| Butadiene-1,3 | 504.0 | 9.575 |
| Tetrakis[(tri-p-cresyl)phosphite]nickel(O) | 61.33 | 0.0429 |
| Toluene | 94.77 | 1.059 |
| Mesitylene | 68.05 | 0.583 |
| Total | 973.15 | 20.574 |

No excess phosphite is charged to the autoclave. After 96 minutes the reaction is proceeding very slowly, if at all, and the reactor contents are analyzed by gas chromatography to show the following products.

Material: Gram-moles/kg. charged

Vinylcyclohexene _____ <0.09
    2-methyl-3-butenenitrile _____ 2.01
    Trans 3-pentenenitrile _____ 3.60
    Cis 3-pentenenitrile _____ Traces
    Adiponitrile _____ Traces The conversion of hydrogen cyanide to nitriles is 60.2%. The number of cycles (mole ratio of nitriles produced to catalyst charged) is 131.

Example LXXIII

This example is similar to Example LXXII except for the use of an excess of triaryl phosphite, which use this example illustrates gives the advantage of greater catalyst efficiency.

A 2-liter agitated autoclave is charged with 350 ml. (liquid measure) of hydrogen cyanide and 800 ml. (liquid measure) of butadiene. This mixture is heated to 100° C. and thereafter maintained at 97.5–100.6° C., and the reaction started by injecting a mixture of catalyst, triaryl phosphite, toluene and mesitylene. The calculated initial charge is:

| Material | Grams | Gram-moles/kg. |
|---|---|---|
| Hydrogen cyanide | 245.0 | 8.875 |
| Butadiene-1,3 | 504.0 | 9.123 |
| Tetrakis[(tri-p-cresyl)phosphite]nickel(O) | 36.70 | 0.0245 |
| Mixed tricresyl phosphite | 49.65 | 0.1381 |
| Toluene | 98.35 | 1.047 |
| Mesitylene | 87.65 | 0.715 |
| Total | 1,021.35 | 19.923 |

The excess triaryl phosphite to catalyst molar ratio is 5.64:1. After 105 minutes the reactor contents are analyzed by gas chromatography to show the following products.

Material: Gram-moles/kg. charged

Vinylcyclohexene _____ <0.05
    2-methyl-3-butenenitrile _____ 2.28
    Trans-3-pentenenitrile _____ 4.11
    Cis-3-pentenenitrile _____ <0.02
    Methylglutaronitrile _____ Trace
    Adiponitrile _____ 0.03

Conversion of hydrogen cyanide to nitriles is 72.2 percent. The number of cycles (mole ratio of nitriles produced to catalyst charged) is 262.

Example LXXIV

A 50 ml., 3-necked, glass flask fitted with a gas inlet tube above liquid level, a thermometer and a gas outlet through a water cooled reflux condenser, is set up in an oil bath.

The reaction equipment is purged with nitrogen and charged with 0.82 g. of Ni(SbØ$_3$)$_2$(CO)$_2$, 0.14 g. of ZnCl$_2$, 25 ml. of 3-pentenenitrile, and 10 g. of triphenylphosphite. The mixture is heated to 80° C. Hydrogen cyanide gas is fed to the system by bubbling nitrogen through liquid hydrogen cyanide at 0° C. and sweeping the resulting gas mixture across the reaction mixture at a rate equal to 0.2 ml. of liquid HCN per hour. The mixture is stirred with a magnetic stirring bar. After about 21.5 hours of operation the reaction is stopped and the liquid product analyzed by gas chromatography. The crude liquid product contains 4.39% adiponitrile, 0.85% 2-methylglutaronitrile, and 0.19% ethylsuccinonitrile.

Example LXXV

A 50 ml., 3-necked, glass flask fitted with a gas inlet tube above liquid level, a thermometer and a gas outlet through a water cooled reflux condenser, is set up in an oil bath.

The reaction equipment is purged with nitrogen and charged with 3.63 g. of Ni(AsØ$_3$)$_2$(CO)$_2$, 0.68 g. of ZnCl$_2$, 25 ml. of 3-pentenenitrile, and 10 g. of triphenylphosphite. The mixture is heated to 120° C. Hydrogen cyanide gas is fed to the system by bubbling nitrogen through liquid hydrogen cyanide at 0° C. and sweeping the resulting gas mixture across the reaction mixture at a rate equal to 0.2 ml. of liquid HCN per hour. The mixture is stirred with a magnetic stirring bar. After about 17.75 hours of operation the reaction is stopped, and the liquid product analyzed by gas chromatography. The crude liquid product contains 21.22% adiponitrile, 4.87% 2-methylglutaronitrile, and 0.74% ethyl-sucinonitrile.

In Examples LXXVI to LXXXVIII, the reactions are run in a 50 ml., three-necked, round bottom glass flask fitted with a thermometer, magnetic stirrer, inlet tube above liquid level, and a water cooled condenser connected to a Dry Ice trap. The flask is heated by an oil bath. The system is purged with nitrogen and the reagents are charged. After further nitrogen purge of the closed system, the mixture is heated to the operating temperature in the example. For operation, nitrogen is bubbled through liquid hydrogen cyanide contained in a 20 ml., ice cooled trap and the resulting mixture is swept across the surface of the reaction mitxure. At the end of the run the mixture is cooled and the product analyzed by gas chromatography and infrared.

Example LXXVI

The reaction flask is charged with 2.0 g. of

Ni[P(OC$_6$H$_5$)$_3$]$_4$ 0.2 g. of ZnCl$_2$, 7 ml. of P(OCH$_6$H$_5$)$_3$, and 20 ml. of allyl phenyl ether. The mixture is maintained at 90° C. and HCN gas is swept across the surface for 22 hours, at the rate of 0.7 ml. of HCN (measured as a liquid) per hour. Gas chromatographic analysis shows new product peaks. Presence of organic nitrile product is confirmed by gas chromatographic separation followed by infrared analysis.

Example LXXVII

The reaction flask is charged with 2.0 g. of

Ni[P(OC$_6$H$_5$)$_3$]$_4$ 0.2 g. of ZnCl$_2$, 7 ml. of P(OC$_6$H$_5$)$_3$ and 20 ml. of N-allyl-N-methylaniline. The mixture is maintained at 100° C., and HCN gas is swept across the surface for 18 hours at the rate of about 1.0 ml. HCN (measured as a liquid) per hour. Gas chromatographic analysis shows new product peaks. Presence of organic nitrile product is confirmed by gas chromatographic separation followed by infrared analysis.

Example LXXVIII

The reaction flask is charged with 2.0 g. of

Ni[P(OC$_6$H$_5$)$_3$]$_4$ 20 ml. of

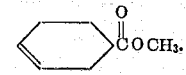

7.0 ml. of P(OC$_6$H$_5$)$_3$, and 0.36 g. of AlCl$_3$. The mixture is maintained at 80° C., and HCN gas is swept across the surface for 20 hours at the rate of 0.6 ml. liquid HCN per hour. Gas chromatographic analysis shows new product peaks. Presence of organic nitrile product is confirmed by chromatographic separation followed by infrared analysis.

Example LXXIX

The reaction flask is charged with 2.0 g. of

Ni[P(OC$_6$H$_5$)$_3$]$_4$ 0.2 g. of ZnCl$_2$, 7 ml. of P(OC$_6$H$_5$)$_3$, 10 g. of 5-norbornene-2,3-dicarboxylic anhydrides and 10 ml. of benzene solvent. The mixture is maintained at 80° C., and HCN gas is swept across the surface for 17 hours at the rate of 0.6 ml. HCN (measured as a liquid) per hour. Infrared analysis of the crude liquid product shows a strong absorption at 2240 cm.$^{-1}$ indicating the presence of an organic nitrile group.

Example LXXX

The reaction flask is charged with 2.0 g. of

Ni[P(OC$_6$H$_5$)$_3$]$_4$ 0.2 g. of ZnCl$_2$, 7.0 ml. of P(OC$_6$H$_5$)$_3$, 5 g. of 3,6-endomethylene-1,2,3,6-tetrahydrophthalic acid and 10 ml. of benzene solvent. The mixture is maintained at 80° C., and HCN gas is swept across the surface for 2 hours at the rate of 13.5 ml. per hour (measured as a liquid). Infrared analysis of the crude liquid product shows a strong absorption at 2240 cm.$^{-1}$ indicating the presence of an organic nitrile group.

Example LXXXI

The reaction flask is charged with 2.0 g. of

Ni[P(OC$_6$H$_5$)$_3$]$_4$ and 10 ml. of methyl-5-norbornene-2-carboxylate. The mixture is maintained at 80° C., and HCN gas is swept across the surface for one hour at the rate of 1.0 ml. HCN (measured as a liquid) per hour. Infrared analysis of the crude liquid product shows a strong absortpion at 2240 cm.$^{-1}$ indicating the presence of an organic nitrile group. Gas chromatography shows three new peaks. The product of each peak is separated by gas chromatography and shows by infrared analysis to contain an organic nitrile group.

Example LXXXII

The reaction flask is charged with 2.0 g. of

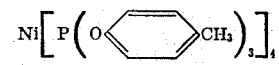

0.2 g. of ZnCl$_2$, 7 ml. of P(OC$_6$H$_5$)$_3$, and 10 ml. of 5-norbornene-2-carboxaldehyde. The mixture is maintained at 80° C., and HCN gas is swept across the surface for 2 hours at the rate of 16 ml. HCN (measured as a liquid) per hour. Infrared analysis of the crude liquid product shows a strong absorption at 2240 cm.$^{-1}$ indicating the presence of an organic nitrile group.

Example LXXXIII

The reaction flask is charged with 2.0 g. of

7 ml. of $P(OC_6H_5)_3$ and 10 ml. of 5-norbornene-2-carboxaldehyde. The mixture is maintained at 80° C., and HCN gas is swept across the surface for 3 hours at the rate of 1.3 ml. HCN (measured as a liquid) per hour. Infrared analysis of crude product shows a strong absorption at 2240 cm.$^{-1}$ indicating the presence of an organic nitrile group.

Example LXXXIV

The reaction flask is charged with 1.0 g. of $Ni(C_5H_5)_2$, 25 ml. of

0.7 g. of $ZnCl_2$, and 25 ml. of 3-pentenenirtile. The mixture is maintained at 100° C. and HCN gas is swept across the surface for 21.5 hours at the rate of 9.8 ml. (measured as a liquid) per hour. Gas chromatographic analysis shows that the crude product contains 16.17% adiponitrile, 3.45% 2-methylglutaronitrile, and 0.34% ethylsuccinonitrile.

Example LXXXV

The reaction flask is charged with 1.78 g. of nickel acetylacetonate, 25 ml. of

0.4 g. of zinc powder, and 25 ml. of 3-pentenenitrile. The mixture is maintained at 100° C. and HCN gas is swept across the surface for 21.5 hours at the rate of 0.6 ml. (measured as a liquid) per hour. Gas chromatographic analysis shows that the crude product contains 10.62% adiponitrile, 6.00% 2-methylglutaronitrile, and 0.37% ethylsuccinonitrile.

Example LXXXVI

The reaction flask is charged with 2.0 g. of $Ni[P(OC_6H_5)_3]_4$, 0.2 g. of $ZnCl_2$, 7.0 ml. of $P(OC_6H_5)_3$, and 10 ml. of methyl-5-norbornene-2-carboxylate. The mixture is maintained at 80° C. and HCN gas is swept across the surface for 2 hours at the rate of 13.5 ml. HCN (measured as a liquid) per hour. Infrared analysis of the crude liquid porduct shows a strong absorption at 2240 cm.$^{-1}$ indicating the presence of an organic nitrile group.

Example LXXXVII

The reaction flask is charged with 2.0 g. of $Ni[P(OC_6H_5)_3]_4$, 7.0 ml. of $P(OC_6H_5)_3$, and 10 ml. of methyl-5-norbornene-2-carboxylate. The mixture is maintained at 80° C. and HCN gas is swept across the surface for 4.5 hours at the rate of 0.5 ml. HCN (measured as a liquid) per hour. Infrared analysis of the crude liquid product shows a strong absorption at 2240 cm.$^{-1}$ indicating the presence of an organic nitrile group.

Example LXXXVIII

A 400 ml. stainless steel pressure tube is charged with 2.0 g. of $Ni[P(OC_6H_5)_3]_4$, 0.2 g. of $ZnCl_2$, 12 g. of $P(OC_6H_5)_3$, 25 ml. of

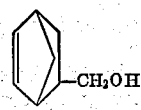

and 8 ml. of liquid HCN. The tube is sealed, cooled in Dry Ice, evacuated briefly, and then heated at 100° C. for 6 hours. Infrared analysis of the crude liquid product shows a strong absorption at 2240 cm.$^{-1}$ indicating the presence of an organic nitrile group.

Example LXXXIX

A 400 ml. stainless steel pressure tube is charged with 5 g. of $Ni[P(OC_6H_5)_3]_4$, 6 g. of $P(OC_6H_5)_3$, 68 g. of piperylene and 30 ml. of liquid HCN. The tube is sealed, cooled in Dry Ice, evacuated briefly, and then at 120° C. for 8 hours. Product is recovered by distillation. Nuclear magnetic resonance analysis confirms the structure

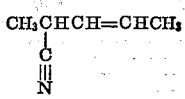

Example LXXXX

A 400 ml. stainless steel pressure tube is charged with 5 g. of $Ni[P(OCH_2CH_3)_3]_4$, 70 g. of piperylene and 37 ml. of liquid HCN. The tube is sealed and cooled in Dry Ice, evacuated breifly and then heated at 80° C. for 6 hours. Gas chromatographic retention time shows the presence of

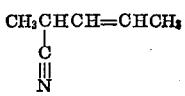

Example LXXXXI

A mixed triaryl phosphite composition is prepared by reacting one mole of phosphorus trichloride with three moles of a phenolic mixture of compounds which mixture contains a trace of phenol, 1.8% o-cresol, 1.4% 2.6 xylenol, 86.1% m and p cresols, 0.3% o-ethylphenol, 9.1% 2,4 and 2,5-xylenols, and 1.2% 2, 3 and 3.5-xylenols. Two hundred and thirty three grams of the resulting aryl phosphite mixture, 6 g. of anhydrous $NiCl_2$, 735 g. of 3-pentenenitrile and a little over 3 g. of zinc metal dust is charged to a stirred reactor under a nitrogen blanket. The mixture is heated to 120° C. for 2 hours during which time the $NiCl_2$ reacted and went into solution. After this time the excess zinc is filtered off. The clear filtrate analyzed to contain 0.29% Ni and 0.36% Zn. Nine grams of this catalyst along with 16.7 g. of 3-pentenenitrile is charged to a hydrocyanation reactor under a nitrogen blanket and heated to 80° C. Liquid hydrogen cyanide was delivered to the solution at a rate of 1.5 mmoles per minute by means of a syringe pump for 76 minutes. The final reaction product was a slurry containing a small amount of solids. The solids were allowed to settle out and the supernatant liquid was analyzed by as chromatography and found to contain 25.05% adiponitrile, 0.99% ethyl-succinonitrile, 6.31% 2-methylglutaronitrile, 1.18% cis-2-pentenenitrile, 1.02% trans-2-pentenenitrile, 41.45% trans-3-pentenenitrile, 2.98% 4-pentenenitrile, and 7.96% cis-3-pentenenitrile. The number of cycles was 140.

Example LXXXXII

Into a 50 ml. stirred glass reactor is charged 19.35 g. of a solution containing:

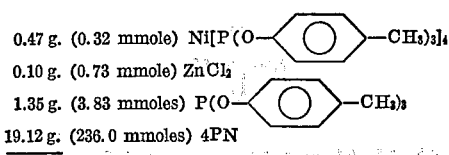

19.12 g. (236.0 mmoles) 4PN 21.04 g. total

The reactor is blanketed with a dry $N_2$ atmosphere and the solution heated and maintained at 80° C. An aliquot of the starting solution is analyzed for mono- and dinitrile products. A slow gaseous feed of HCN is passed over the reaction surface for 296 minutes at the rate of 1.0 ml./hr. (measured as a liquid at 0° C.), with aliquots being removed for analysis after 10, 15, 25, 35, 45, and 296 minutes. The weight of the final reaction mixture is 10.70 g.; the weight of aliquots removed is 8.48 g.

The analyses for the samples taken after zero and after 296 minutes are as follows:

WEIGHT PERCENT ANALYSES

| Compound | Minutes at— | |
|---|---|---|
| | t=0 | t=296 |
| ADN | | 44.92 |
| ESN | | 0.84 |
| MGN | | 10.09 |
| C2PN | | 0.57 |
| C2M2BN | <0.12 | |
| VN | | <0.10 |
| T2PN | | 0.38 |
| T3PN | | 19.95 |
| 4PN | 85.85 | 1.35 |
| C3PN | | 4.10 |

The catalyst efficiency after 296 minltes is 174 cycles, based only on product left in the reactor. The value of 174 cycles does not include product dinitriles and unreacted active catalyst removed in the aliquots for analysis.

What is claimed is:

1. A process of hydrocyanating an ethylenic carbon-carbon double bond in an organic compound selected from the group consisting of hydrocarbons and hydrocarbons containing groups selected from the group consisting of

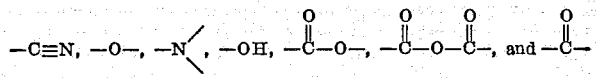

wherein each open bond is connected to hydrogen or a hydrocarbon group wherein said carbon-carbon double bond is insulated from any of said groups by at least one carbon atom, which organic compound contains from 2 to 20 carbon atoms, comprising feeding a reactor with said organic compound, hydrogen cyanide, a nickel compound in a form selected from the group consisting of organonickel compounds, nickel and a sigma pi bonding neutral ligand, and a divalent nickel compound and a reducing agent and, at least 6 moles per mole of nickel present of a triaryl phosphite, wherein each aryl group contains up to 18 carbon atoms, said 6 moles of triaryl phosphite including any triaryl phosphite fed as part of said nickel compound, maintaining said reactor at a temperature of from —25° C. to 200° C., and at from 0.3 to 100 atmospheres pressure, and recovering an organic nitrile derived from said organic compound by addition of hydrogen cyanide to an ethylenic carbon-carbon double bond.

2. The process of claim 1 wherein the nickel compound fed to the reactor is an organonickel compound.

3. The process of claim 1 wherein the nickel compound has the structure

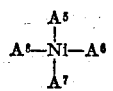

wherein $A^5$, $A^6$, $A^7$, and $A^8$ are selected from the group consisting of CO and M(XYZ) wherein M is selected from the group consisting of P, As, and Sb, and wherein X, Y and Z are selected from the group consisting of R and OR wherein R is selected from the group consisting of alkyl and aryl groups of up to 18 carbon atoms.

4. The process of claim 3 wherein $A^5$, $A^6$, $A^7$, and $A^8$ are M(XYZ) and M is P.

5. The process of claim 4 wherein X, Y and Z are OR.

6. The process of claim 5 wherein each R is an aryl radical.

7. The process of claim 6 wherein the organic compound being hydrocyanated is butadiene and the principal compounds recovered are selected from the group consisting of 3-pentenenitrile and 2-methyl-3-butenenitrile.

8. The process of claim 6 wherein the organic compound being hydrocyanated is selected from the group consisting of 3-pentenenitrile and 4-pentenenitrile and the principal compound recovered is adiponitrile.

9. The process of claim 8 wherein the hydrogen cyanide is swept across the surface of or bubbled through the reaction mixture.

10. The process of claim 7 wherein the triaryl phosphite is selected from the group consisting of triphenyl phosphite, tri(p-methoxyphenyl) phosphite, and tricresyl phosphites.

11. The process of claim 9 wherein the triaryl phosphite is selected from the group consisting of triphenyl phosphite, tri(p-methoxyphenyl) phosphite, and tricresyl phosphites.

12. A process of hydrocyanating an ethylenic carbon-carbon double bond in an organic compound selected from the group consisting of hydrocarbons and hydrocarbons containing groups selected from the group consisting of

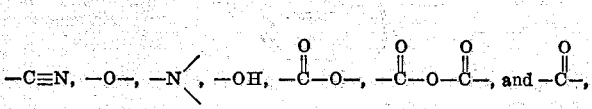

wherein each open bond is connected to hydrogen or a hydrocarbon group wherein said carbon-carbon double is insulated from any of said groups by at least one carbon atom which organic compound contains from 2 to 20 carbon atoms comprising contacting said organic compound with hydrogen cyanide at from —25° C. to 200° C., and at from 0.3 to 100 atmospheres pressure, in the presence of a compound of the formula $Ni(MXYZ)_4$ wherein M is selected from the group consisting of P, As and Sb and wherein X, Y, and Z are selected from the group consisting of R and OR and wherein R is selected from the group consisting of alkyl and aryl groups having up to 18 carbon atoms, and at least 6 moles, per mole of nickel present, of a triaryl phosphite wherein the aryl groups contain up to 18 carbon atoms, said 6 moles of triaryl phosphite including any triaryl phosphite present as $Ni(MXYZ)_4$ and recovering an organic nitrile derived from said organic compound by addition of hydrogen cyanide to an ethylenic carbon-carbon double bond.

13. The process of claim 12 wherein $Ni(MXYZ)_4$ is $Ni[P(OR)_3]_4$ wherein each R is an aryl radical of up to 18 carbon atoms.

14. The process of claim 13 wherein the organic compound is selected from the group consitsing of olefins and olefins containing a —C≡N group.

15. The process of claim 14 wherein the organic compound is butadiene and the principal compound recovered is selected from the group consisting of 3-pentenenitrile and 2-methyl-3-butenenitrile.

16. The process of claim 14 wherein the organic compound is selected from the group consisting of 3-pentenenitrile and 4-pentenenitrile and the principal compound recovered is adiponitrile.

17. The process of claim 15 wherein the triaryl phosphite is selected from the group consisting of triphenyl phosphite, tri(p-methoxyphenyl)phosphite, and tricresyl phosphites.

18. The process of claim 16 wherein the triaryl phosphite is selected from the group consisting of triphenyl phosphite, tri(p-methoxyphenyl)phosphite, and tricresyl phosphites.

References Cited

UNITED STATES PATENTS

| 3,496,217 | 2/1970 | Drinkard, Jr. et al. | 260—465.8 |
| 3,496,218 | 2/1970 | Drinkard, Jr. | 260—465.8 |
| 3,496,215 | 2/1970 | Drinkard, Jr. et al. | 260—465.8 |
| 3,536,748 | 10/1970 | Drinkard, Jr. et al. | 260—465.8 X |
| 3,522,288 | 7/1970 | Drinkard, Jr. et al. | 260—465.8 |

JOSEPH P. BRUST, Primary Examiner

U.S. Cl. X.R.

260—346.3, 439 R, 439 CY, 441, 446, 464, 465 R, 465 C, 465 D, 465 E, 465 F, 465 H, 465.1, 465.4, 465.5 R, 465.6, 465.8 R